(12) United States Patent  (10) Patent No.: US 8,564,819 B2
Kawamura  (45) Date of Patent: Oct. 22, 2013

(54) IMAGE PRINTING SYSTEM AND IMAGE PROCESSING METHOD

(75) Inventor: Takuya Kawamura, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 486 days.

(21) Appl. No.: 12/973,001

(22) Filed: Dec. 20, 2010

(65) Prior Publication Data

US 2011/0157606 A1 Jun. 30, 2011

(30) Foreign Application Priority Data

Dec. 28, 2009 (JP) ................................. 2009-298152

(51) Int. Cl.
*G06F 3/12* (2006.01)
(52) U.S. Cl.
USPC .............................. 358/1.15; 358/1.8; 358/1.9
(58) Field of Classification Search
USPC .......... 358/1.8, 1.9, 2.99, 3.01, 3.1, 3.2, 3.24, 358/1.15, 1.16, 1.18
See application file for complete search history.

(56) References Cited

U.S. PATENT DOCUMENTS

2008/0246791 A1 10/2008 Kaneko et al.

FOREIGN PATENT DOCUMENTS

JP 2007-168202 A 7/2007
JP 2008-173969 A 7/2008

*Primary Examiner* — Vu B Hang
(74) *Attorney, Agent, or Firm* — Fitzpatrick, Cella, Harper & Scinto

(57) ABSTRACT

There are provided an image printing system and an image processing method which can perform printing control for a unit pixel without losing a positional relationship between a dot arrangement pattern and a mask pattern even when index processing and mask processing are executed independently from each other. For this purpose, an index start position command (901) is transmitted, and the mask pattern is arranged such that the top of the mask pattern matches a top raster of a received index processing start position when the mask processing is executed. Thereby, it becomes possible to securely execute the printing control for a unit pixel without losing the positional relationship between the dot arrangement pattern and the mask pattern which are generated in association with each other.

6 Claims, 24 Drawing Sheets

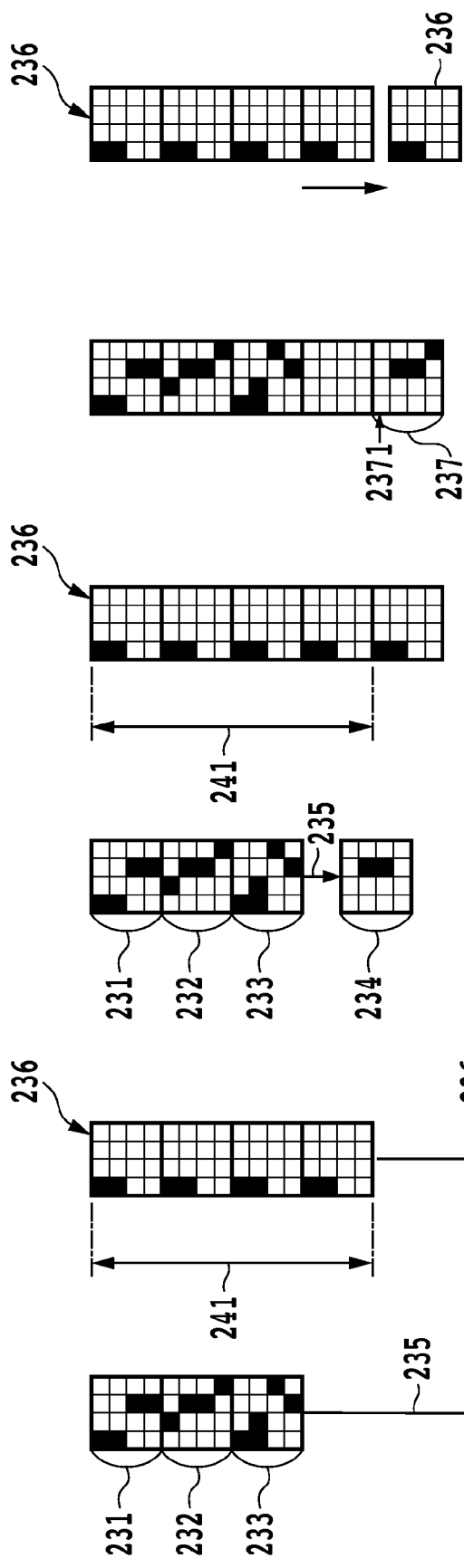

IMAGE PRINTING SYSTEM AND IMAGE PROCESSING METHOD

BACKGROUND OF THE INVENTION

1. Field of the Invention

The present invention relates to an image printing apparatus and particularly to an image printing system and an image processing method which perform dot printing for pseudo halftone representation by means of multi-pass printing.

2. Description of the Related Art

Recently, an effort to realize a higher resolution and a smaller droplet has been promoted in an ink jet printing apparatus which is capable of representing desired density on a printing medium by means of pseudo halftone reproduction, and there is devised a measure for carrying out the sequence of image processing for this purpose as simply and speedily as possible. For example, multi-value density data of an original image (256 gradation levels) for a pixel which has a relatively low resolution is quantized into lower level multi-value density data (17 gradation levels), and then converted into binary density data suitable for a resolution which can be printed by a printing apparatus, after having been subjected to various kinds of processing.

As a method of converting the low resolution multi-value (17 gradation levels) data into the binary data, there is known a data processing method called index processing. The index processing selects one of plural dot arrangement patterns which are preliminarily prepared as shown in FIG. 4 according to the value of the multi-value data, and thereby converts one multi-value data into plural binary data. The result of such index processing determines a pixel (1) which actually prints a dot and a pixel (0) which does not print a dot, and desired density can be represented on a printing medium by means of a pseudo halftone.

An actual dot is printed by the main scan of a printing head on a pixel of the printing medium where dot printing has been determined by the index processing, and at this time, the ink jet printing apparatus frequently employs a multi-pass printing method for improving image uniformity. The multi-pass printing method is a method of printing the plural dots which can be printed in one main scan of the printing head, by dividing them into plural main scans. At this time, a mask pattern, for example as shown in FIG. 5, is used which preliminarily defines the pixel (1) that allows printing and the pixel (0) that does not allow printing in one main scan of the printing head. Then, by a logical product operation between the allowance (1)/non-allowance (0) defined by such a mask pattern for the printing of each pixel and the printing (1)/non-printing (0) determined by the index processing, the data to be actually printed by the printing head is determined for each main scan.

In a printing system using both of the index processing and the mask processing, there has been proposed a method of carrying out various kinds of printing control by causing these two kinds of processing to be associated with each other. For example, Japanese Patent Laid-Open No. 2007-168202 discloses a configuration to cause a satellite not to be conspicuous in a high speed printing mode by making the dot arrange pattern different according to a set printing mode (mask pattern). Further, Japanese Patent Laid-Open No. 2008-173969 discloses a method of preparing the dot arrangement pattern and the mask pattern in association with each other and thereby controlling the order of ink application for the same image area in an ink jet printing apparatus which performs printing by using plural kinds of ink.

Meanwhile, for obtaining the advantages of such Japanese Patent Laid-Open No. 2007-168202 and Japanese Patent Laid-Open No. 2008-173969, it is necessary to promise (fix) a positional relationship between the dot arrangement pattern and the mask pattern which are prepared in association with each other. That is, in Japanese Patent Laid-Open No. 2008-173969, for example, when a shift occurs in the positional relationship between the dot arrangement pattern and the mask pattern, it becomes impossible to control the order of ink application for a unit pixel which is formed by one dot arrangement pattern.

Recently, however, each size of the dot arrangement pattern and the mask pattern has been expanded both in the main scan direction and the sub-scan direction and also the content thereof has become complicated. Accordingly, raster image processing generating raster data while performing the index processing and the mask processing to be performed for the multi-pass printing are frequently configured as independent jobs, respectively, and there occurs even a situation in which the positional relationship is not always fixed between the both kinds of processing.

Such a situation will be explained below in detail. For example, the raster image processing performs a job of generating binary data by the index processing and compressing this binary data. Further, the raster image processing searches image data generated by an application, and generates a command for moving the printing medium (line feed) in the sub-scan direction by an amount corresponding to a blank space portion of an image, for example. Then, the raster image processing generates print job data which can be transferred to the printing apparatus, by arranging the compressed printing data and the command for sub-scan direction movement.

Meanwhile, a printing apparatus which has received print job data reproduces the binary data for printing by decompressing the compressed printing data and performs the multi-pass printing by using the mask pattern for this data. Further, the printing apparatus conveys (line-feed) the printing medium in the sub-scan direction by a designated amount according to the sub-scan direction movement command.

At this time, the designated movement amount in the sub-scan direction does not always correspond to the sub-scan direction size of the mask pattern or the dot arrangement pattern or the number of printing elements arranged in the printing head. Accordingly, depending on the movement amount in the sub-scan direction, the start position of the binary data arranged after the sub-scan direction movement command is sometimes shifted from the mask pattern prepared in the printing apparatus.

FIGS. 15A to 15C are schematic diagrams for explaining a state of the shift between a dot arrangement pattern and a mask pattern caused by such sub-scan direction movement.

FIG. 15A is a diagram showing an arrangement state of the dot arrangement pattern and the mask pattern when the raster image processing instructs the sub-scan direction movement during the processing while using the dot arrangement pattern of 4×4 pixels. Each of numerals 231 to 234 indicates a pixel area in the dot arrangement pattern of 4×4 pixel area and is expressed with the binary data converted by the index processing. Numeral 235 indicates a sub-scan direction movement instructed between the dot arrangement pattern 233 and the dot arrangement pattern 234. These 231 to 235 are instructed in the raster image processing.

Meanwhile, numeral 236 indicates a mask pattern prepared by the printing apparatus. The mask pattern 236 has a unit of 4×4 pixels having the same size as that of the dot arrangement pattern to be associated with the dot arrangement pattern, and has a configuration in which this unit is continuously disposed in a width corresponding to a printing width of the printing head. Here is shown a case of using a printing head having the number of printing elements corresponding to 16 pixels, and numeral 241 indicates an area which can be printed by one main scan of the printing head. In the mask processing performed in the printing apparatus, the top of the mask pattern 236 is disposed so as to match the top of the first dot arrangement pattern 231, as shown in the drawing.

In this manner, when the instruction 235 of the sub-scan direction movement which exceeds the printing width of the printing head is included in the continuously disposed binary data sets, it is possible to match the top of the dot arrangement pattern 234 after the movement with that of the mask pattern 236 in the next main scan. Accordingly, a shift does not occur in the positional relationship between the dot arrangement pattern having a unit of 4×4 pixels and the mask pattern.

On the other hand, FIG. 15B is a diagram showing a state of the arrangement of the dot arrangement pattern and the mask pattern when the raster image processing instructs the sub-scan direction movement having an amount which does not exceed the printing width of the printing head (here, 2 pixels) in the continuously disposed dot arrangement patterns. When the instruction 235 of the sub-scan direction movement corresponding to two pixels is included in the continuously disposed binary data in this manner, the dot arrangement pattern 234 is disposed at a position shifted by two pixels from the 4×4 pixels forming the mask pattern 236. Then, when the printing is carried out in this state, it becomes impossible to control the ink application order and the like for a unit area.

Further, FIG. 15C is a diagram showing a state of the arrangement of the dot arrangement pattern and the mask pattern when a null raster is detected and the raster image processing program instructs this null raster not as the binary data but as the sub-scan direction movement. In this case, when a raster 2371 is a null, the raster is counted as a shift amount in the sub-scan direction even if the raster forms a part of the dot arrangement pattern 237, and a shift occurs from the mask pattern 236. That is, in the dot arrangement pattern 237 and the succeeding dot arrangement patterns, it becomes impossible to control the ink application order and the like for a unit area.

Each of the phenomena as explained above is caused by that information about the position of the dot arrangement pattern generated by the raster image processing is not provided accurately to the printing apparatus side.

SUMMARY OF THE INVENTION

The present invention has been achieved for solving such a problem. Accordingly, an object thereof is to provide an image printing system and an image processing method which can perform printing control for a unit pixel without losing a positional relationship between a dot arrangement pattern and a mask pattern even when index processing and mask processing are executed independently from each other.

In a first aspect of the present invention, there is provided an image printing system configured with a host apparatus generating print job data according to image data of an original image and a printing apparatus printing an image on a printing medium by repeating a main scan of a printing head and a conveyance operation to convey the printing medium in a direction intersecting the main scan according to the print job data, the host apparatus comprising: a unit configured to execute index processing which converts a unit pixel having multi-value density data obtained from the image data into a plurality of printing pixels having binary data that defines printing/non-printing of a dot; a unit configured to generate an index start position command notifying the position of a raster for which the index processing has been started; a unit configured to compress the binary data for each raster and generate compressed data; a unit configured to generate a sub-scan direction movement command according to a blank space portion in the image data of the original image in the sub-scan direction; and a unit configured to generate the print job data using the index start position command, the compressed data, and the sub-scan direction movement command, an the printing apparatus comprising: a unit configured to receive the print job data and to arrange a mask pattern which defines allowance or non-allowance of dot printing for each of the printing pixels, according to the index start position command; a unit configured to decompress the compressed data; and a conveyance command generation unit configured to generate a conveyance command for conveying the printing medium in the sub-scan direction according to the sub-scan direction movement command.

In a second aspect of the present invention, there is provided an image processing method for printing an image on a printing medium, in which a host apparatus generates print job data according to image data of an original image, and a printing apparatus which has received the print job data repeats a main scan of a printing head and a conveyance operation conveying the printing medium in a sub-scan direction intersecting the main scan according to the print job data, the method comprising causing the host apparatus to execute: a step for executing index processing which converts a unit pixel having multi-value density data obtained from the image data into a plurality of printing pixels having binary data that defines printing/non-printing of a dot; a step for generating an index start position command notifying the position of a raster for which the index processing has been started; a step for compressing the binary data for each raster and generate compressed data; a step for generating a sub-scan direction movement command according a blank space portion in the image data of the original image in a sub-scan direction; and a step for generating the print job data using the index start position command, the compressed data, and the sub-scan direction movement command, and the method also comprising causing the printing apparatus to execute: a step for receiving the print job data; a step for arranging a mask pattern which defines allowance or non-allowance of dot printing for each of the printing pixels, according to the index start position command; a step for decompressing the compressed data; and a step for generating a conveyance command for conveying the printing medium in the sub-scan direction according to the sub-scan direction movement command.

Further features of the present invention will become apparent from the following description of exemplary embodiments (with reference to the attached drawings).

BRIEF DESCRIPTION OF THE DRAWINGS

FIGS. 15A to 15C are schematic diagrams explaining a state of a shift between a dot arrangement pattern and a mask pattern, which is caused by movement in the sub-scan direction.

DESCRIPTION OF THE EMBODIMENTS (Embodiment 1)

Hereinafter, an image processing apparatus of the present invention will be explained by the use of drawings.

Figure 1:
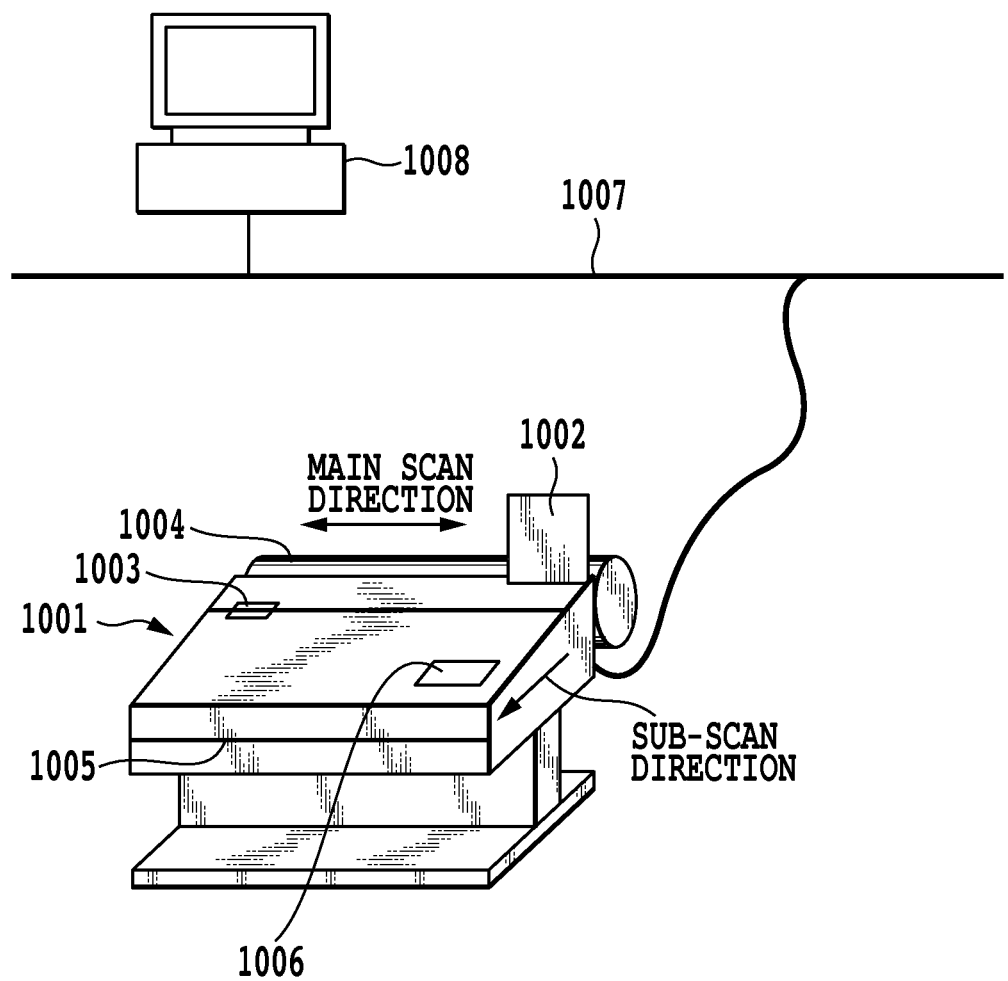
FIG. 1 is a diagram for explaining a configuration of an image printing system applicable to the present invention.

FIG. 1 is a diagram for explaining a configuration of an image printing system applicable to the present invention. In the present embodiment, an image generated in a host apparatus 1008 is supplied to a printing apparatus 1001 via a network LAN 1007 and the image is output from the printing apparatus 1001. An application generating the image and raster image processing are executed in the host apparatus 1008 and printing control of mask processing and later are executed in the printing apparatus 1001.

The printing apparatus 1001 is an ink jet printer for a large size printing medium. When a printing start command is entered in the printing apparatus 1001 via a LAN cable 1007, a roll paper 1002 wound around a roll paper unit 1004 is conveyed in the sub-scan direction within the apparatus. In a printing head 1003, a plurality of printing element arrays corresponding to cyan, magenta, yellow, and black, respectively, is arranged in parallel in the main scan direction. In each of the printing element array a plurality of printing elements are arranged in the sub-scan direction. Then the printing head 1003 ejects ink onto a conveyed printing medium 1002 according to a printing signal while moving in the main scan direction. Such a main scan of the printing head 1003 and the conveying operation of the printing medium 1002 in a direction intersecting the main scan direction (sub-scan direction) are intermittently repeated, and thereby the image is formed in a stepwise manner on the printing medium 1002. Here, the present embodiment is assumed to perform the multi-pass printing with eight passes. The printing medium 1002 of a part where the printing has finished is conveyed to a discharge unit 1005 and cut by a cutter which is not shown in the drawing. A user can provide various instructions regarding the printing in an operation unit 1006.

Figure 2:
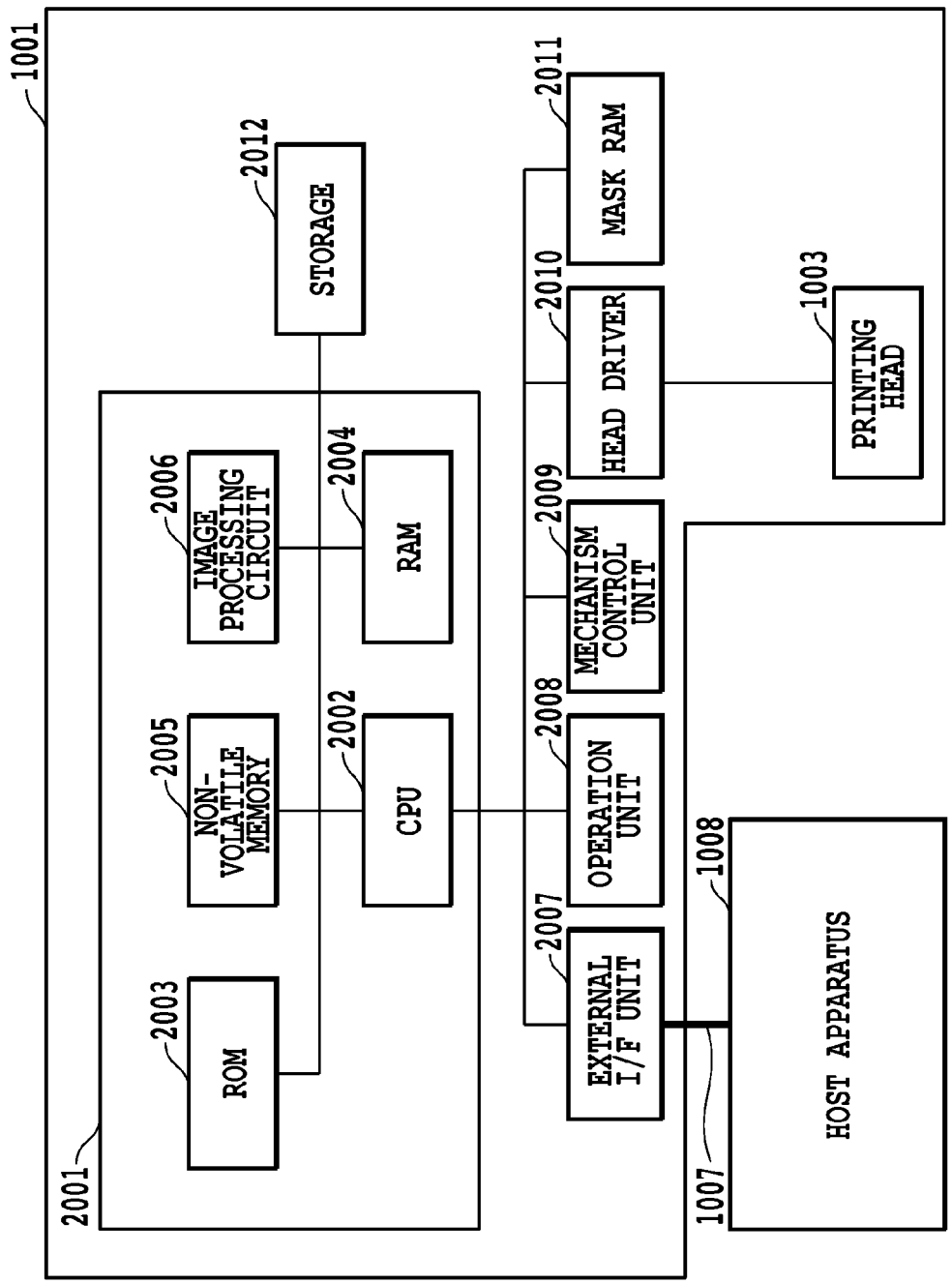
FIG. 2 is a block diagram explaining an image printing system applicable to the present invention.

FIG. 2 is a block diagram for explaining a control configuration of the above image printing system. Print job data generated in the host apparatus is received by an external I/F unit 2007 of the printing apparatus via the LAN cable 1007. The received print job data is preserved in a storage 2012 as a file by the control unit 2001.

The control unit 2001 is a mechanism performing the control of the entire printing apparatus 1001, and is provided with a CPU 2002, a ROM 2003, a RAM 2004, a non-volatile memory 2005, an image processing circuit 2006, and the like. The CPU 2002 executes various kinds of processing according to a program stored in the ROM 2003 using the RAM 2004 as a work area. The RAM 2004 has a data memory area secured for storing the print job data and image data received from the outside other than such a work area. The non-volatile memory 2005 stores setting items which change occasionally such as a kind of the printing medium and a printing mode under printing, in a volatile manner independently from power supply. The image processing circuit 2006 performs processing on the received image data for each pixel and generates binary image data to be transmitted to the printing head 1003.

A mechanism control unit 2009 is a driving unit for causing various mechanisms disposed within the printing apparatus 1001 to function. The mechanism control unit 2009 is configured with, for example, a feed/conveyance driving unit for feeding and conveying the roll paper 1002 in the apparatus, a cutter driving unit for cutting the roll paper, a carriage driving unit moving a carriage mounting the printing head 1003 in the main scan direction, and the like. A head driver 2010 drives the printing head 1003 to eject ink according to a printing signal received from the control unit 2001.

A mask RAM is a RAM for temporarily storing a mask pattern to be used in executing the multi-pass printing. A logical product operation is performed between the binary image data generated by the control unit 2001 and the mask pattern stored in the mask RAM 2011, and the result is supplied to the head driver 2010 as printing data.

Figure 3:
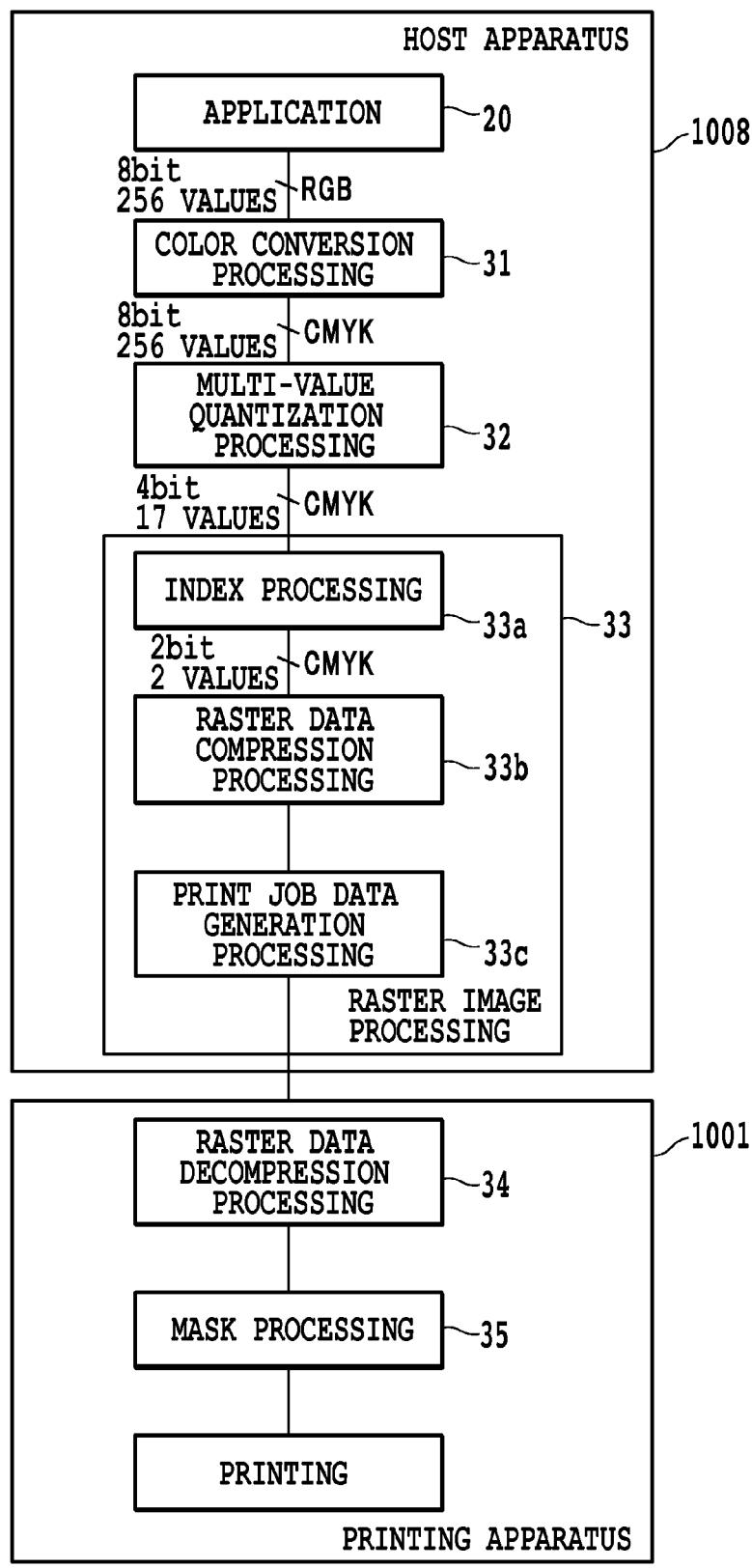
FIG. 3 is a block diagram explaining image processing in an embodiment.

FIG. 3 is a block diagram for explaining a main process of image processing in an image printing system of the present embodiment. A printer driver installed in the host apparatus 1008 receives an image generated by an application 20 and first executes color conversion processing 31. In the color conversion processing 31, RGB image data of 300 dpi and 8 bits (256 gradation levels) is converted into CMYK density data of 300 dpi and 8 bits (256 gradation levels). Next, multi-value quantization processing 32 quantizes the CMYK density data of 300 dpi and 8 bits (256 gradation levels) into CMYK density data of 300 dpi and 4 bits (17 gradation levels) by multi-value error diffusion processing or the like. After that, raster image processing 33 executes index processing 33a, raster data compression processing 33b, and print job data generation processing 33c.

The index processing 33a converts the CMYK density data of 300 dpi and 4 bits (17 gradation levels) into binary CMYK data of 1200 dpi and 1 bit (2 gradation levels). The raster data compression processing 33b compresses the binary data generated in the index processing 33a for each raster. The print job data generation processing 33c searches for a blank part of the original image to generate a sub-scan direction movement command, combines this command with the obtained compressed data, further adds various kinds of information regarding the printing control to a header part, and thereby generates the print job data. Then, the printer driver transfers the print job data generated in this manner to the printing apparatus 1001.

The printing apparatus 1001 having received the print job data performs decompression processing 34 for the compressed raster data and performs mask processing 35 for the restored raster data. Thereby, printing data to be printed in each printing scan is obtained. The control unit 2001 performs printing operation according to the printing data generated in this manner, the received sub-scan direction movement command, and the information added to the header part of the print job data.

Figure 4:
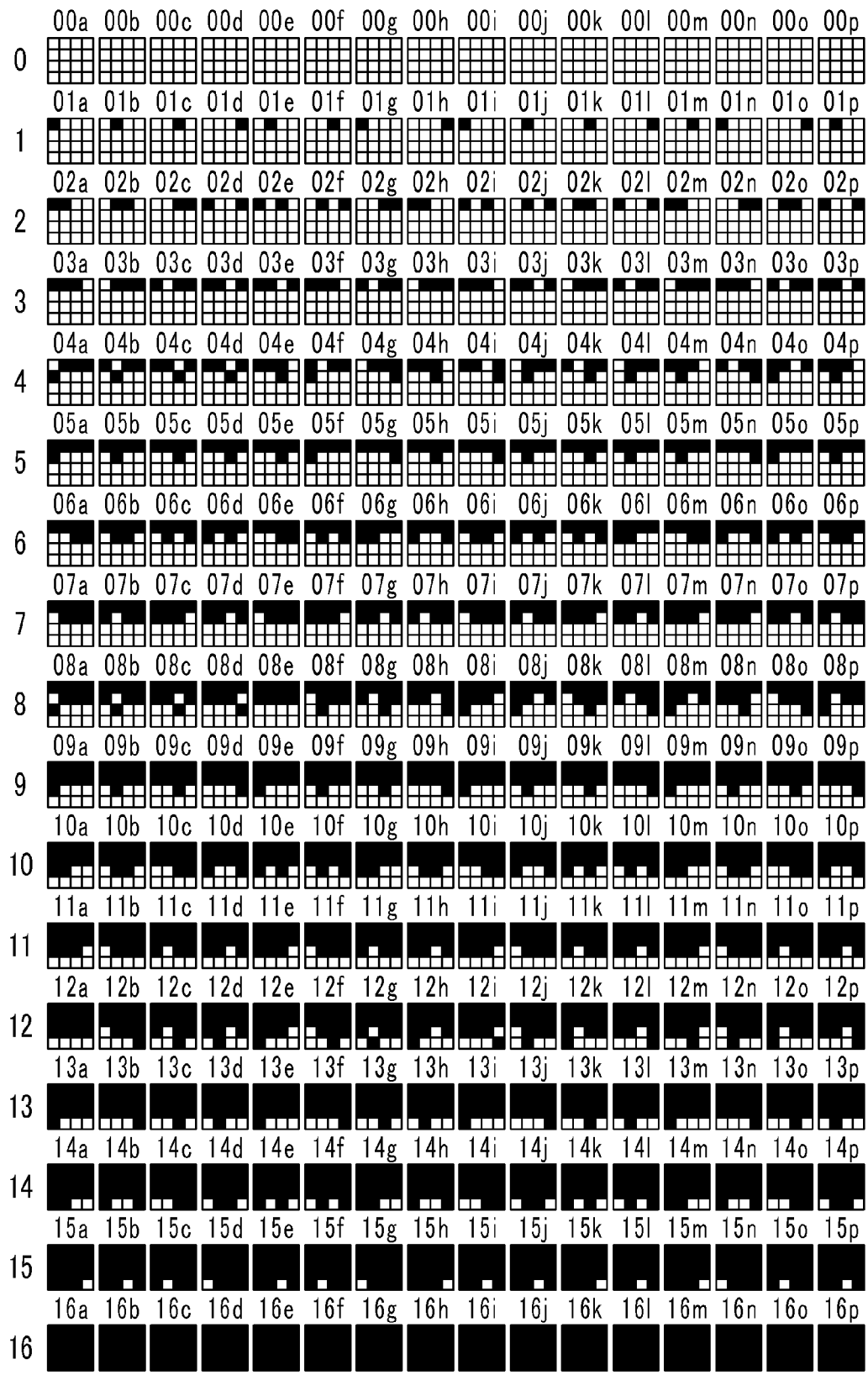
FIG. 4 is a diagram explaining a dot arrangement pattern of index processing applicable to the present invention.

FIG. 4 is a diagram for explaining a dot arrangement pattern to be referred to in the index processing 33a of the present embodiment. The left side shows the density data of 17 values to be input into the index processing 33a, and the right side shows the dot arrangement patterns converted in correspondence with the respective density data. In the index processing 33a of the present embodiment, the density data of 300 dpi and 17 values is converted into the binary data of 1200 dpi and thereby each of the density data of 17 values is made to correspond to a dot arrangement pattern of 4×4 pixels in which printing (black)/non-printing (white) is defined for each pixel. Hereinafter, this specification distinguishes between a pixel (300 dpi) to be input into the index processing in this manner and a pixel (1200 dpi) for which printing/non-printing is defined after the index processing, as a unit pixel and a printing pixel, respectively.

Here, the present embodiment prepares 16 kinds of dot arrangement pattern which are shown in the horizontal direction, for the same density data. Then, even when the unit pixel having the same intensity value is continued, plural dot arrangement patterns are configured to be used for the conversion repeatedly so as not to provide a biased arrangement of the printing (black) in the printing pixel level. While the dot arrangement pattern is shown here for one color, the dot arrangement patterns different from one another may be prepared for ink colors, respectively.

Figure 5:
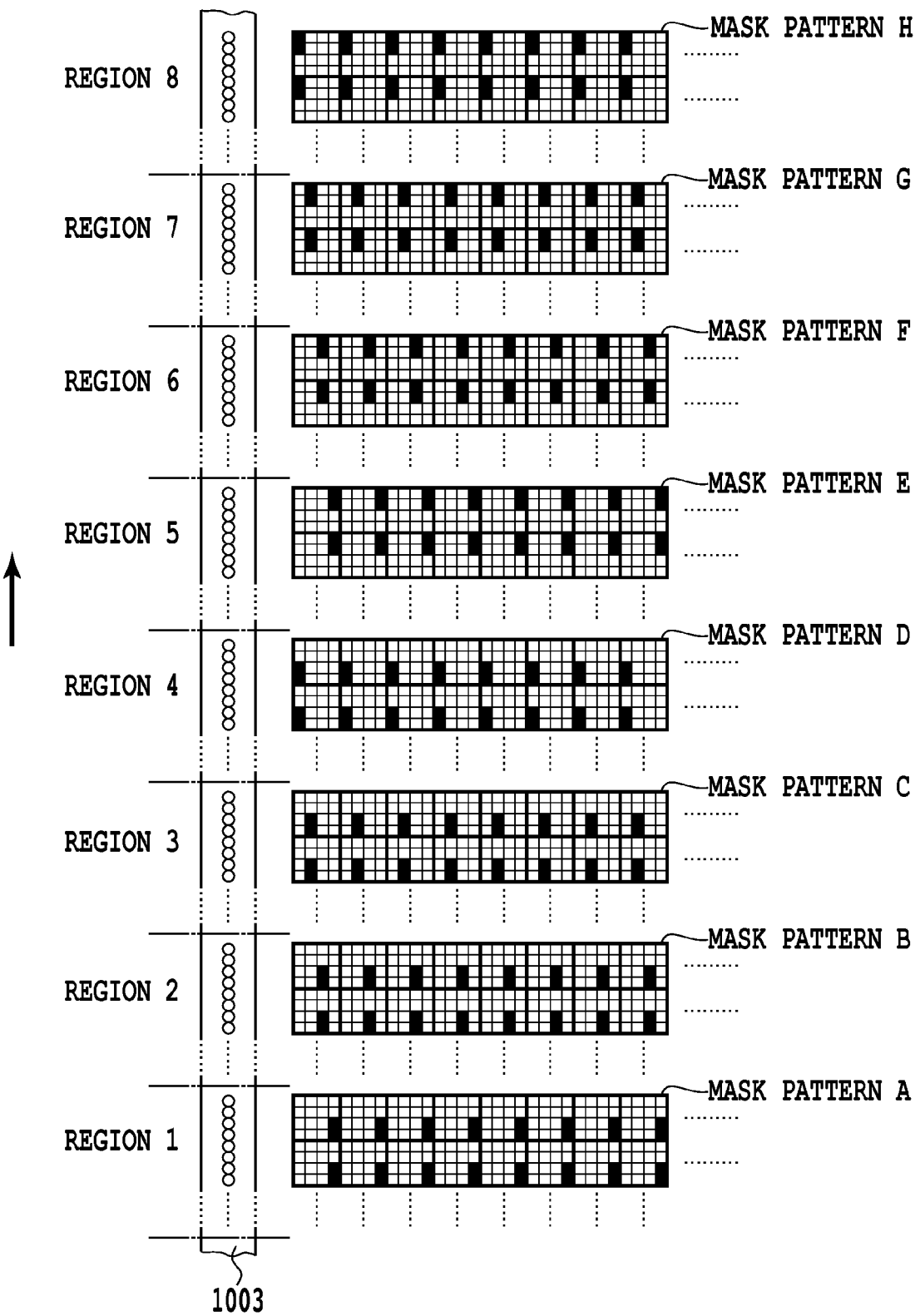
FIG. 5 is a diagram showing a mask pattern to be used in an embodiment.

FIG. 5 is a diagram showing an example of a mask pattern to be used in the mask processing 36 of the present embodiment. The printing head 1003 used in the present embodiment has 1280 printing elements arranged in the sub-scan direction and the mask pattern defines allowance (black) or non-allowance (white) of the printing for the plural printing pixels which correspond to the respective printing elements and are arranged in the main scan direction.

Here is shown a mask pattern for the case of performing the multi-pass printing with eight passes. In the case of the multi-pass printing with eight passes, the 1280 printing elements arranged on the printing head can be considered to be divided into eight regions each having 160 printing elements and the divided regions are provided with mask patterns having a complementary relationship to one another, respectively. That is, Region 1 is provided with Mask pattern A, Region 2 is provided with Mask pattern B, . . . , and Region 8 is provided with Mask pattern H, and these Mask patterns A to H have a complementary relationship to one another. The printing medium is conveyed in the direction of the arrow by a distance corresponding to one region every time the printing head 1003 performs one main scan. Thereby, the image is printed in a stepwise manner on a unit area of the printing medium when the main scan is performed eight times for Region 1 to Region 8, respectively.

The mask pattern of the present embodiment is generated in association with the dot arrangement pattern to be referred to in the index processing as in Japanese Patent Laid-Open No. 2008-173969, and thereby the mask pattern itself has a size formed by a unit of 4×4 printing pixels (size enclosed by a bold line). Then, by the matching between the dot arrangement pattern of the 4×4 printing pixels converted in the index processing and mask pattern unit of 4×4 printing pixels, the advantage of Japanese Patent Laid-Open No. 2008-173969 such as the control of the ink application order for each of the unit pixels can be realized. Note that, while the mask pattern is shown here for one color, the mask patterns different from one another may be prepared for the ink colors, respectively.

Figure 6:
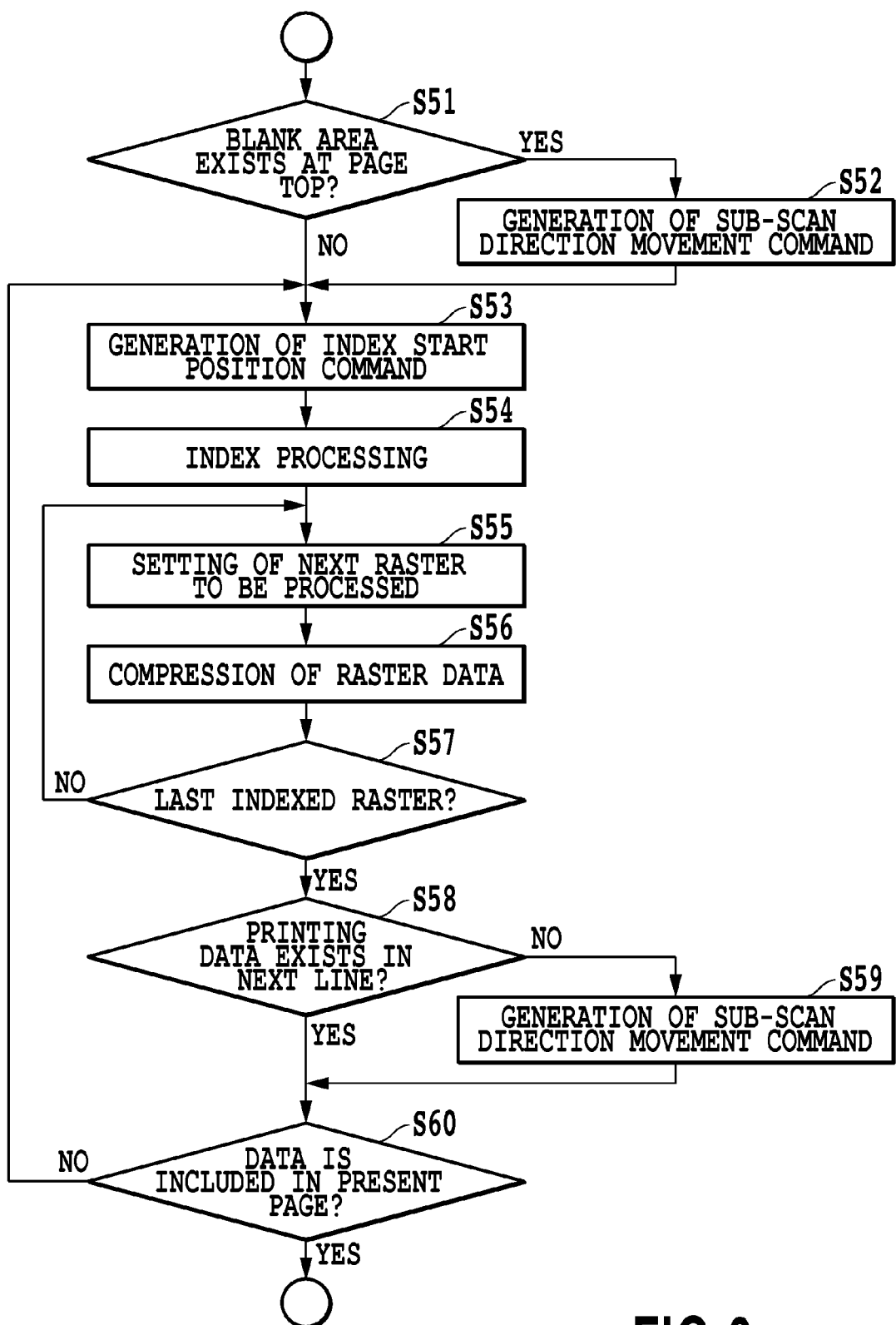
FIG. 6 is a flowchart explaining a process of generating print job data in an embodiment.

FIG. 6 is a flowchart for explaining a process of generating the print job data for the processing of one page in the raster image processing 33 in the present embodiment. The raster image processing 33 first searches the original image generated by the application and determines whether a blank area exists or not at the top of a page, in Step S51. If the blank area is determined to exist, the process goes to Step S52 and generates a sub-scan direction movement command so as to cause the conveying operation to be performed in an amount corresponding to the blank area. On the other hand, if the blank area is determined not to exist, the process goes to Step S53.

In Step S53, the raster image processing 33 detects a line position of the first unit pixel in the original image and generates a command notifying the top raster position as a index start position. In succeeding step S54, the raster image processing 33 performs the index processing for unit pixels of the focused line. That is, by referring to the dot arrangement pattern shown in FIG. 4, the raster image processing converts the 17 value data in each of the unit pixels arranged in the one focused line into the binary data corresponding to the 4×4 printing pixels. Thereby, raster data is generated for four rasters.

In Step S55, the raster image processing 33 sets the position of the raster to be processed. When the process comes to this Step S55 immediately after the index processing in Step S54, the raster to be processed is the top raster among the four rasters processed in the index processing. After that, the raster image processing 33 compresses the binary data of the set raster to generate the compressed data for one raster in Step S56.

In Step S57, the raster image processing 33 confirms whether or not the currently processed raster is the last raster among the rasters processed in the index processing in Step S54. In the present embodiment performing the index processing of 4×4 printing pixels, the fourth raster is the last raster. Then, if the currently processed raster is not the last raster, the process returns to Step S55 and the raster to be processed is moved to the next raster. On the other hand, if the currently processed raster is determined to be the last raster, the process goes to Step S58.

In Step S58, the raster image processing 33 determines whether the image data exists or not in the next line which is yet to be index-processed. Here, if the image data is determined not to exist in the next line, the process goes to Step S59 and a sub-scan direction movement command is generated for the movement corresponding to a distance to a line where the image data exists. Then, the raster image processing 33 searches for the line where the image data exists and sets it as a focused line. On the other hand, if the image data is determined to exist in the next line in the Step S58, the raster image processing 33 sets the next line as a focused line and the process goes to Step S60.

In Step S60, the raster image processing 33 confirms whether the focused line is located within the present page or not. If the focused line is confirmed to be located within the present page, the process returns to Step S53 for performing the index processing for the focused line. On the other hand, if the focused line is determined not to be located within the present page, the processing in the present page is terminated.

Figure 7:
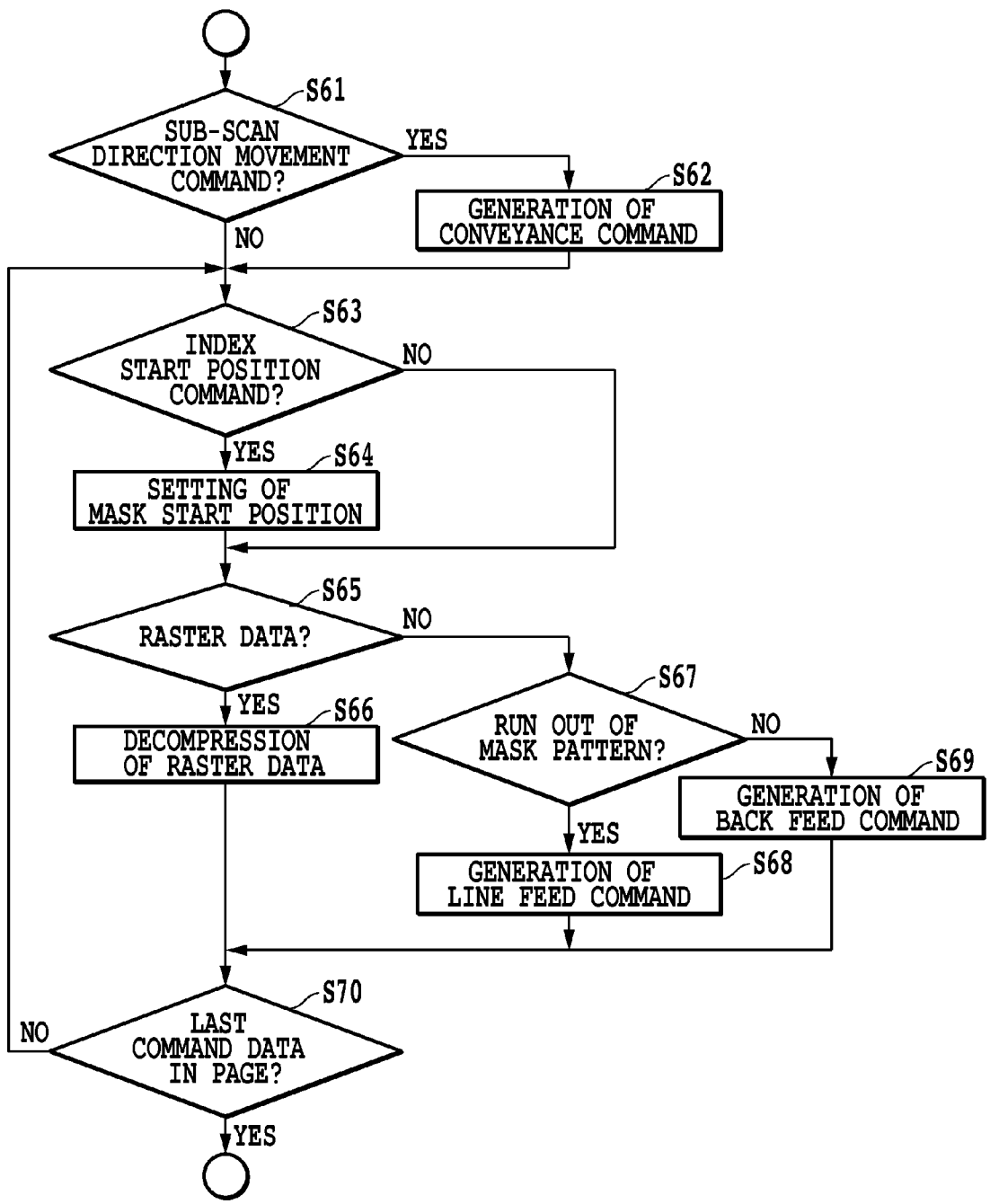
FIG. 7 is a flowchart explaining a command generation process of a printing operation in a control unit of a printing apparatus applicable to the present invention.

FIG. 7 is a flowchart for explaining a process in which the control unit 2001 in the printing apparatus 1001 of the present embodiment generates a command for performing the printing operation according to the print job data for one page. The control unit 2001, while preserving the received print job data in the storage 2012, develops various kinds of command and the image data by searching the data stored in this job data from the top.

First, in Step S61, the control unit 2001 determines whether the top of the print job data is the sub-scan direction movement command or not. If the top data is determined to be the sub-scan direction movement command, the process goes to Step S62 and the control unit 2001 generates conveyance command for causing the mechanism control unit 2009 to execute conveyance according to the command. The sub-scan direction movement command developed here corresponds to the sub-scan direction movement command generated in Step S52 in the flowchart of FIG. 6.

In Step S63, the control unit 2001 determines whether the next data of the print job data is an index start position command or not. If the data is determined to be the index start position command, the process goes to Step S64 and the control unit 2001 disposes the mask pattern (position of the printing head) so as to match the top of the mask pattern with a raster position where the index start position is set. The index start position command developed here corresponds to the index start position command generated in Step S53 of FIG. 6. On the other hand, if the next data is determined not to be the index start position command in Step S63, the process jumps to Step S65.

In Step S65, the control unit 2001 determines whether the next data is the compressed raster data or the sub-scan direction movement command. If the next data is determined to be the raster data, the process goes to Step S66 and the control unit 2001 decompresses the compressed data and restores the raster data for one raster. On the other hand, if the next data is determined to be the sub-scan direction movement command, the process goes to Step S67.

In Step S67, the control unit 2001 obtains a movement amount from the sub-scan direction movement command and determines whether or not the raster position of the movement destination runs off the edge of the divided region of the mask pattern which has been set in Step S64. If the raster position is determined to run off the edge of the divided region, the process goes to Step S68 and the control unit 2001 generates a conveyance command for causing the mechanism control unit 2009 to execute the movement according the above movement amount. The conveyance at this time is forward direction conveyance, that is, line feed. On the other hand, if the raster position of the movement destination is determined not to run off the edge of the divided region of the mask pattern which has been set in Step S64, the process goes to Step S69. In Step S69, the control unit 2001 generates a conveyance command for causing the mechanism control unit 2009 to execute the movement so as to locate the raster position of the movement destination at the top of the divided region of the mask pattern. The conveyance command at this time resultantly becomes a command for a back feed instruction. Here, the command data developed in Step S67 to Step S69 corresponds to the sub-scan direction movement command generated in Step S59 of the flowchart in FIG. 6.

In succeeding Step S70, the control unit 2001 determines whether or not the command data developed in above Steps S65 to S69 is the last command data in the print job data. Then, if the command data to be processed is determined still to remain, the process returns to Step S63 and starts the processing for the next command data. On the other hand, if the command data to be processed is determined no more to remain, the present process is terminated.

FIGS. 8A to 8D are diagrams for explaining an image example generated by an application and a state of image conversion when the processing of the present embodiment is performed on this image.

Figure 8A:
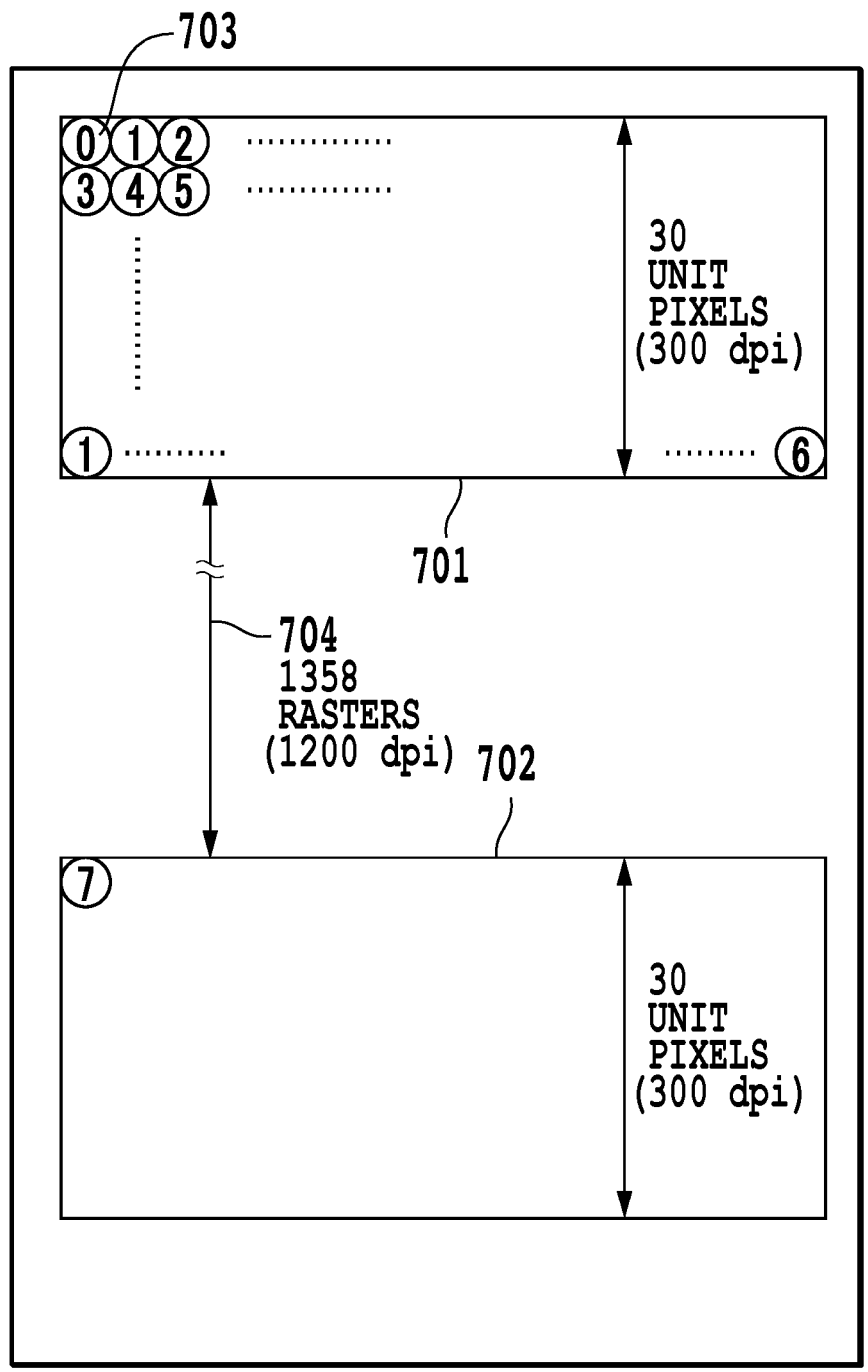
FIGS. 8A to 8D are diagrams for explaining processing of an embodiment for an image example generated by an application.

FIG. 8A shows an example of an image generated by an application of the host apparatus. Here is shown a state in which an image area 701 located at the top of a page and an image area 702 located at the back end of the page are disposed having a blank space 704 which corresponds to 1358 rasters in between. Each of the image areas 701 and 702 is formed by plural unit pixels 703 which are arranged in a resolution of 300 dpi and each of the unit pixels has one of the 17 gradation values of 0 to 16. In the present embodiment, the image area 701 as well as the image area 702 is assumed to have the unit pixels corresponding to 30 lines in the sub-scan direction.

Figure 8B:
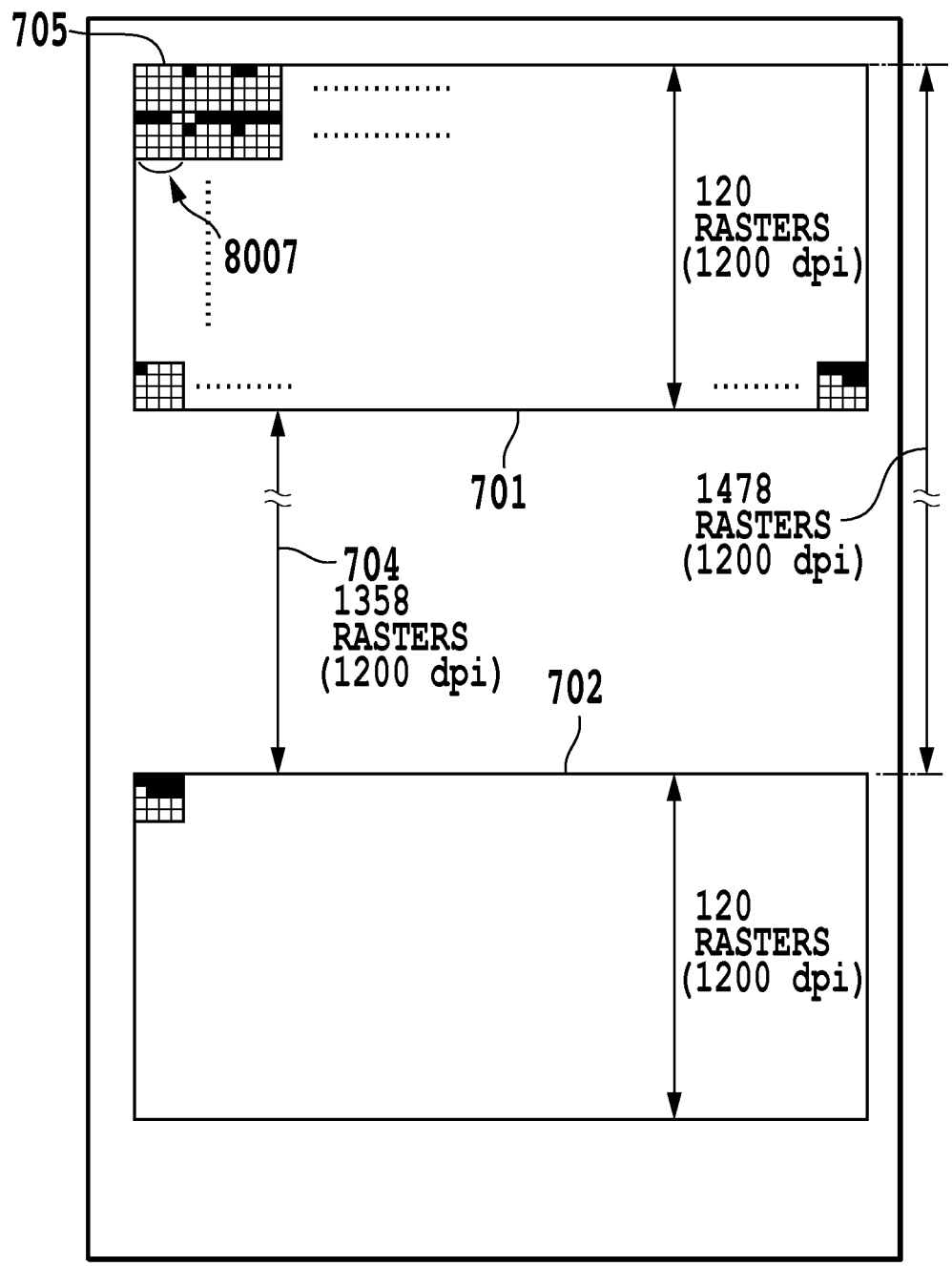

FIG. 8B is a diagram showing a result of the index processing performed on the image shown in FIG. 8A by the raster image processing of the present embodiment. With reference to the dot arrangement pattern shown in FIG. 4, each of the unit pixels 703 is converted into a dot arrangement pattern 705 which is formed by the 4×4 printing pixels. Thereby, each of the image areas 701 and 702 which is formed by the unit pixels of 300 dpi is converted into a 120 raster image area which is formed by the printing pixels of 1200 dpi. At this time, the index start position of the image area 701 becomes the top raster within the page and the index start position of the image area 702 becomes a raster which is the 1478th (corresponding to 120+1358) raster from the top raster.

Figure 8C:
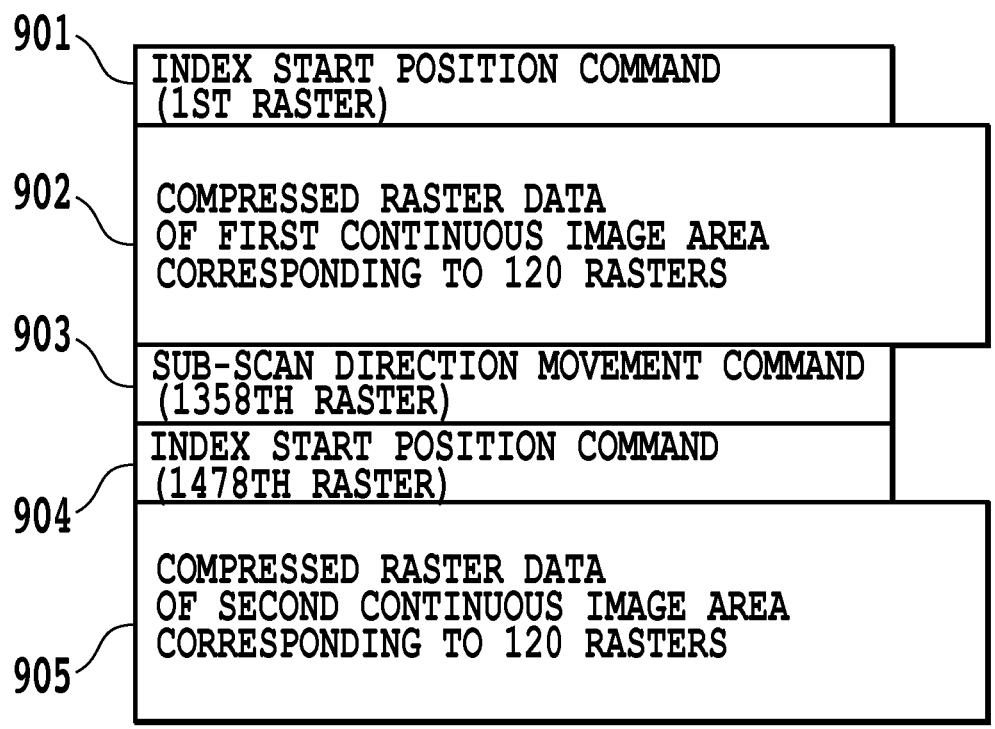

FIG. 8C is a schematic diagram for explaining a configuration of the print job data generated by the raster image processing of the present embodiment by the use of the image after the index processing shown in FIG. 8B. The index development shown in FIG. 8B and the job data generation are performed gradually according to the flowchart shown in FIG. 6. Note that, while typically various kinds of information regarding the printing control such as the number of passes in the multi-pass and the size and kind of the printing medium are added to the top of the print job data as a header, the print job data is shown here without the header part.

First, in the present example, an index start position command 901 is memorized in the top of the print job data for notifying the index start position of the image area 701. This command corresponds to the command generated in Step S53 of the flowchart shown in FIG. 6. In the present example, a blank space portion does not exist at the top of the page and thereby the top of the print job data describes the index start position command 901 in this manner. However, if a blank space portion exists, a sub-scan direction movement command corresponding to the width thereof is generated in Step S52 and memorized in the head of the print job data.

In an area 902 succeeding the index start position command 901, the raster data included in the image area 701 is described sequentially from the top raster. Each of the raster data sets at this time is memorized in a state compressed in Step S66.

In an area succeeding the compressed raster data 902 of the image area 701, a sub-scan direction movement command 903 generated in Step S59 is memorized. That is, the sub-scan direction movement command corresponding to 1538 rasters are memorized in the present example.

In the succeeding area, an index start position command 904 is memorized for notifying the raster position of index start position for the image area 702. This command is also generated in Step S53 as same as for the image area 701. Referring to FIG. 8B again, this command, which is disposed succeeding the sub-scan direction movement command 903 and notifies the index start position, has a content notifying 1478 rasters which are the sum of 120 rasters of the image area 701 located at the top and 1358 ratsers of the sub-scan direction movement.

In an area 905 succeeding the index start position command 904 for the image area 702, the compressed data of the raster data included in the image area 702 is memorized sequentially from the top raster.

Figure 8D:
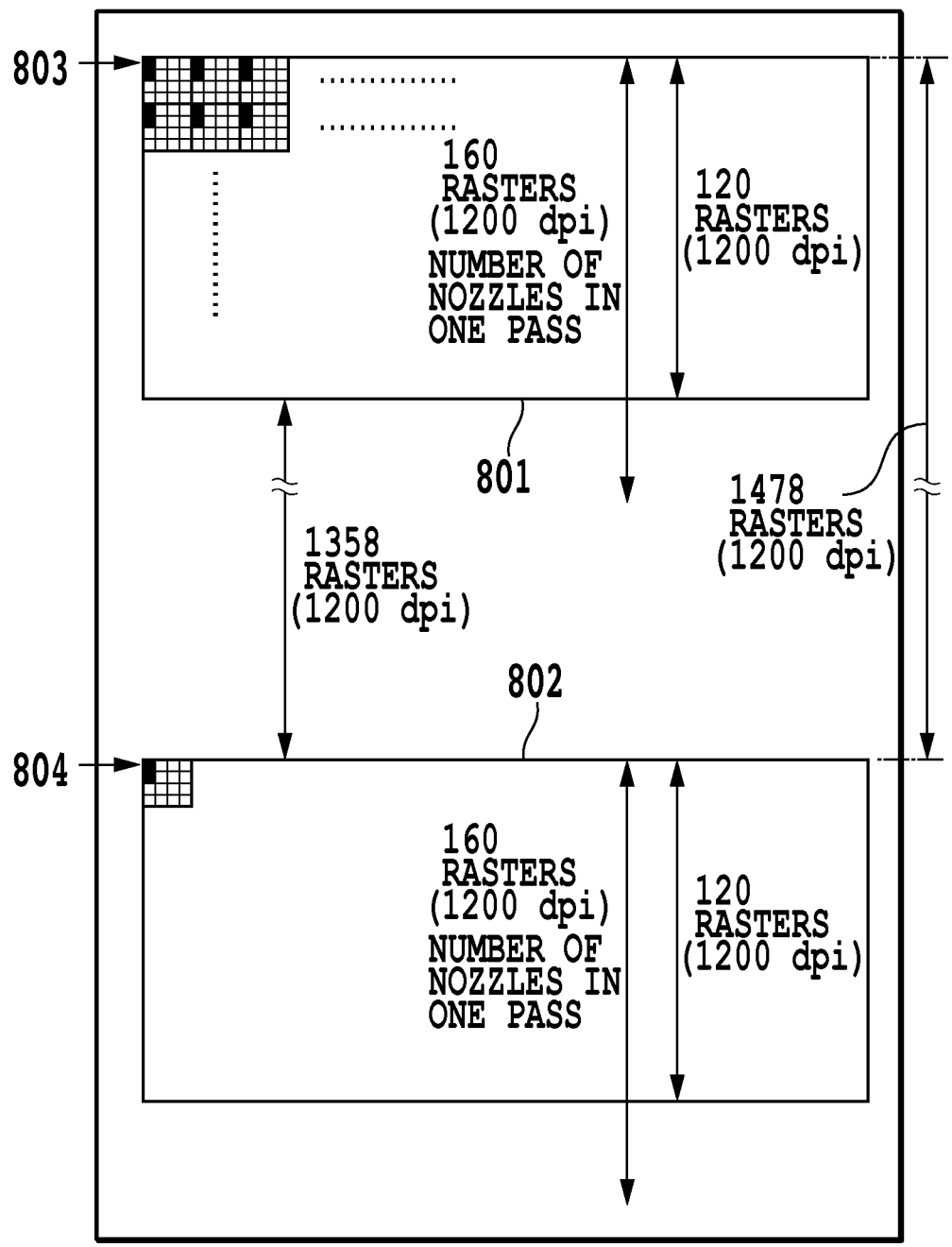

FIG. 8D is a diagram showing a state in which the control unit 2001 of the printing apparatus having received the print job data which is configured as shown in FIG. 8C develops the print job data and arranges a predetermined mask pattern for the mask processing. The print job data development and the mask pattern arrangement shown in FIG. 8D are performed by the control unit 2001 according to the flowchart shown in FIG. 7.

The control unit 2001, after having searched the print job data shown in FIG. 8C from the top and confirmed that the top command is the index start position command 901, arranges the predetermined mask pattern so as to match the top of the printing pixel thereof with the top raster of the index start position. That is, in the present example, the control unit 2001 arranges the mask pattern shown in FIG. 5 so as to match the top printing pixel of the mask pattern with the top raster of the page. FIG. 8D shows the mask pattern region provided to the image area 701 as a region 801. It is apparent that the position of the top printing pixel in the dot arrangement pattern shown in FIG. 4 and the position of the top printing pixel in the mask pattern shown in FIG. 5 match with each other at a top raster 803.

For the image area 702, the control unit 2001 arranges the mask pattern shown in FIG. 5 so as to match the top of the printing pixel of the mask pattern with the raster (1475th raster) set by the index start position command 904 for the image area 702. FIG. 8D shows the mask pattern region provided to the image area 702 as a region 802. It is apparent that the position of the top printing pixel in the dot arrangement pattern shown in FIG. 4 and the position of the top printing pixel in the mask pattern shown in FIG. 5 match with each other at the 1978th raster 804.

The control unit 2001 decompresses the compressed raster data 902 of the image area 701 memorized next to the index start position command 901 for each raster and restores the image area 701 in the same area as that of the mask pattern region 801. Further, the control unit 2001 decompresses the compressed raster data 905 of the image area 702 memorized next to the index start position command 904 for each raster and restores the image area 702 in the same area as that of the mask pattern region 802. By performing the logical product operation for each printing pixel between the raster data restored in this manner and the arranged mask pattern, the control unit 2001 decides the position of the printing pixel where ejection is actually performed in each printing scan. Then, in the image for which printing is performed in this manner, the positional relationship is not lost between the dot arrangement pattern and the mask pattern which are generated in association with each other, and thereby it is possible to securely perform the control such as keeping the ink application order constant in the unit pixel.

FIGS. 9A to 9D are diagrams for explaining a state of the processing for another image example generated by the application in the present embodiment. Here, a blank space corresponding to 30 rasters exists between an image area 101 located at the top of a page and the succeeding image area 102. Also in the present example, each of the image area 101 and the image area 102 has unit pixels corresponding to 30 lines in the sub-scan direction.

Figure 9A:
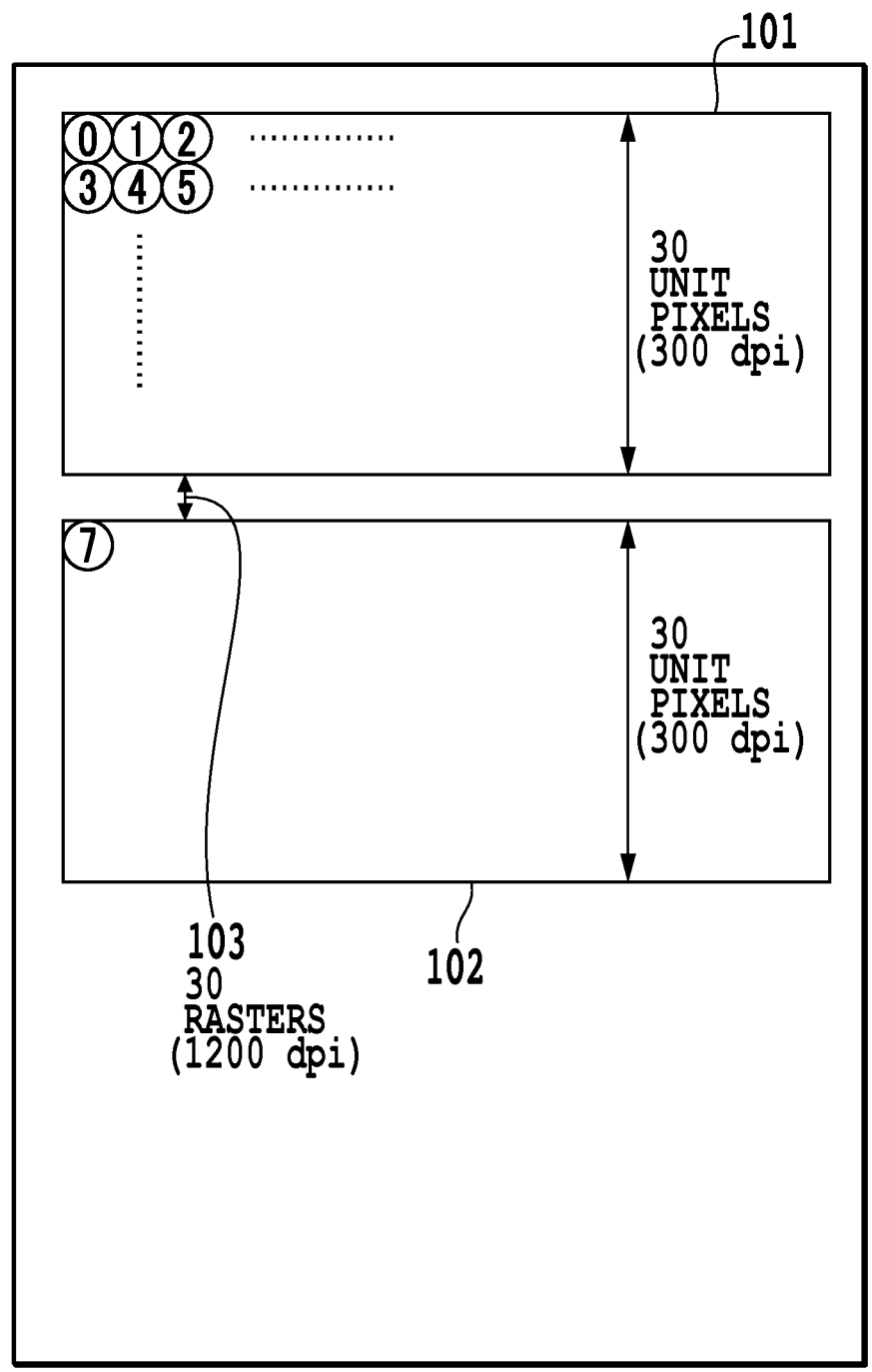
FIGS. 9A to 9D are diagrams for explaining processing for an image example generated by an application.
Figure 9B:
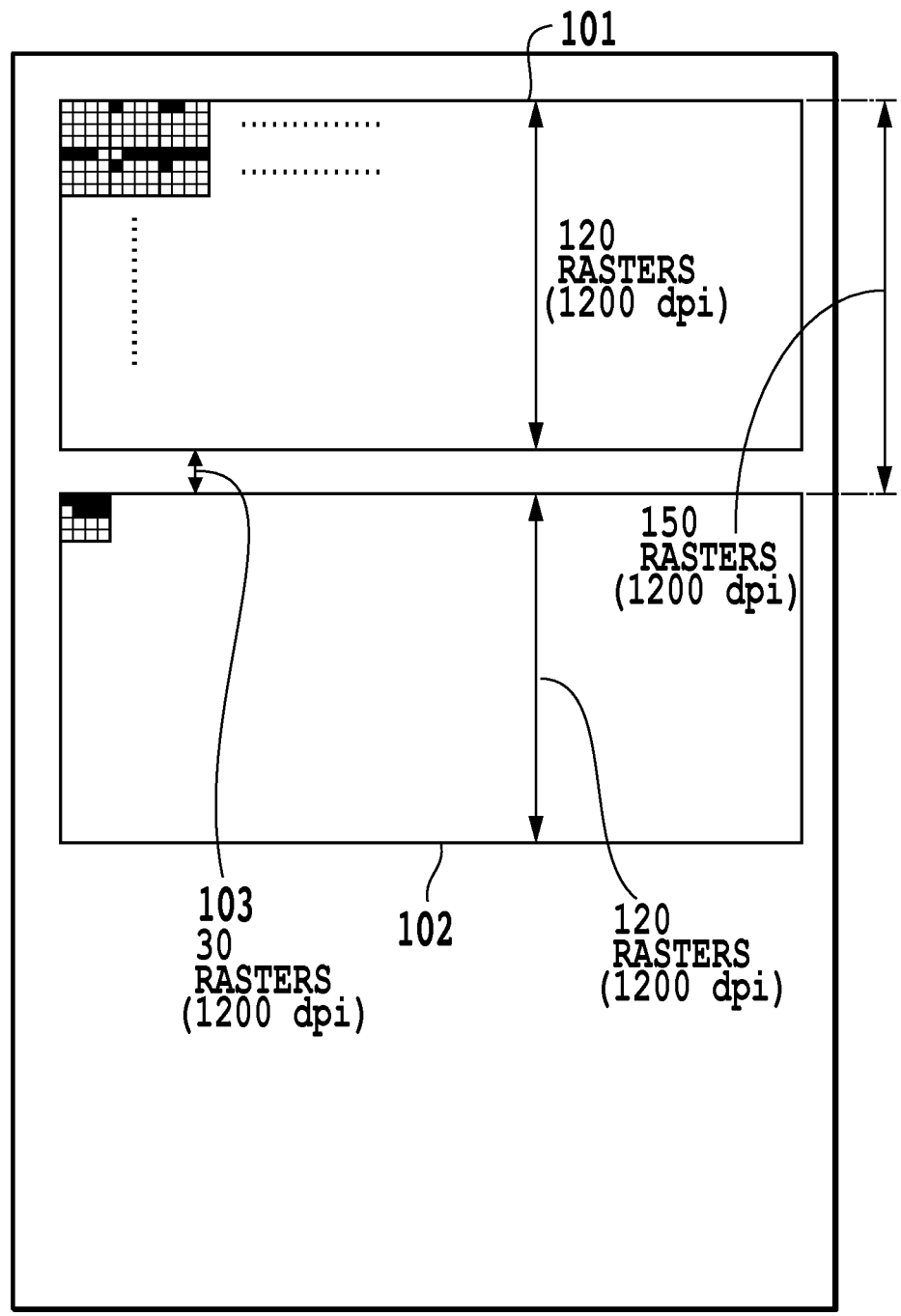
Figure 9C:
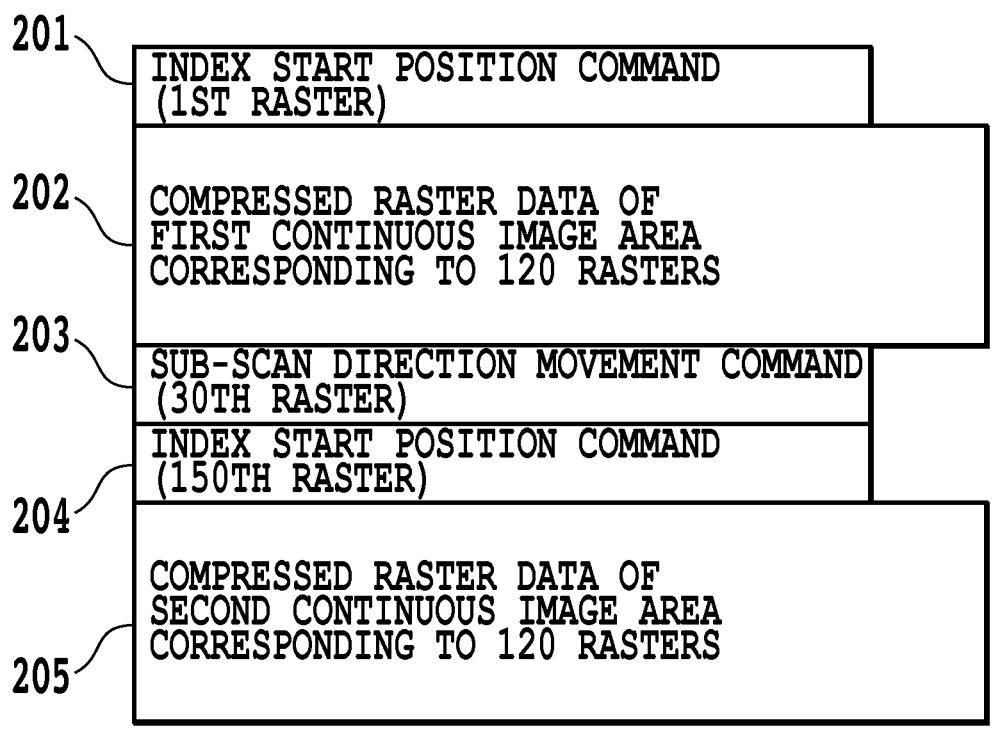
Figure 9D:
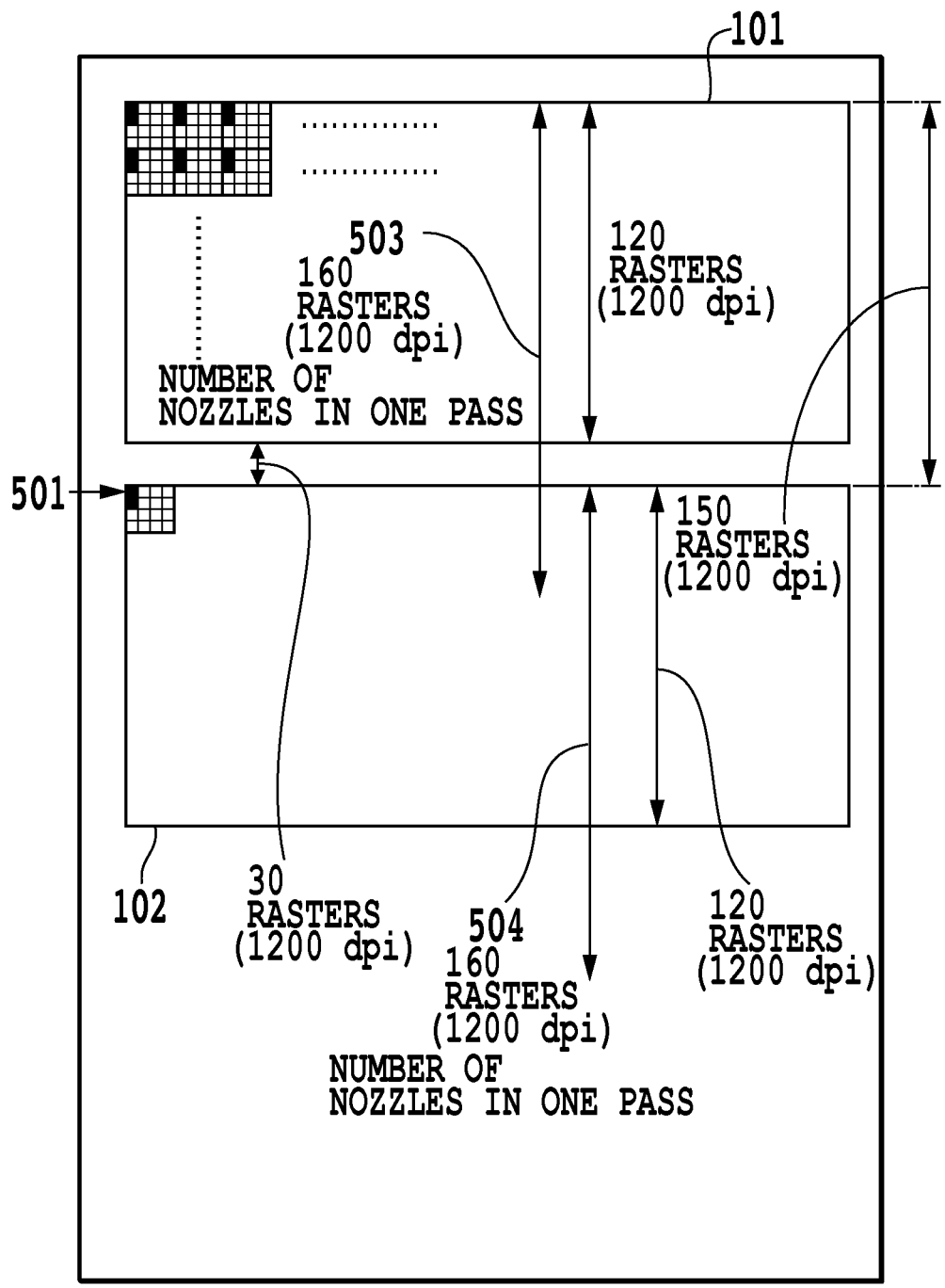

In this case, a sub-scan direction movement command 203 shown in FIG. 9C instructs movement corresponding to 30 rasters. Further, a command 204 for notifying the raster position of the index start position for the image area 102 instructs the 150th raster which corresponds to the sum of 120 rasters of the image area 101 and 30 rasters of the sub-scan direction movement.

When the printing operation is performed on such an image, the index start positions of the image area 101 and the image area 102 are disposed in the same divided region of the printing head. That is, the top parts of the image area 101 and the image area 102 are located in the positions, respectively, where the printing can be performed by the same main scan of the printing head. When the mask pattern of the present embodiment is used as shown in FIG. 5, however, the blank space corresponding to 30 lines causes a shift between the top of the image area 102 and the top of the 4×4 pixels in the mask pattern.

Accordingly, the present embodiment prints the image area 101 and the image area 102 in the different main scans, respectively, for avoiding the printing in a state including such a shift between the image area and the mask pattern. Specifically, referring to FIG. 9D, the printing head performs the printing for the image area 101 but does not perform the printing for the image area 102 in the main scan having a state in which one of the divided regions is caused to match a position shown by the arrow 503. Then, after the printing for the image area 101 has been completed, back feed of the printing medium is performed (step S70) by the use of an index start position command 204 for the image area 102, and the top of the divided regions in the printing head is caused to match a top raster 501 of the image area 102. After that, the printing head carries out the main scan for the image area 102 at a position indicated by the arrow 504. Thereby, it becomes possible to control the ink application order in each of the unit pixels without losing the positional relationship between the dot arrangement pattern and the mask pattern, in either the image area 101 or the image area 102.

FIGS. 10A to 10D are diagrams for explaining a state of the processing of the present embodiment regarding still another image example generated by the application. Here, a blank space 303 corresponding to 40 rasters exists between an image area 301 located at the top of a page and the succeeding image area 302. Also in the present example, each of the image area 301 and the image area 302 has unit pixels corresponding to 30 lines in the sub-scan direction.

In the present example, an index start position command may be generated for the image area 302 as in the above example. However, the blank space 303 corresponding to 40 rasters is a multiple of four rasters, and thereby a shift does not occur between the image area 302 and the mask pattern arranged so as to match the image area 301 without a sub-scan direction movement command newly generated for the image area 302. Accordingly, FIG. 10C shows an example of the print job data which does not memorized the sub-scan direction movement command for the image area 302. While a step is not particularly provided for determining whether the number of rasters in the blank space is a multiple of four in this manner in the flowchart shown in FIG. 6, the mask processing by the control unit 2001 can be made simpler by such determination.

In the present embodiment, as explained above, the transmission of the command notifying the index start position for each image area makes it possible to avoid the loss of the positional relationship between the dot arrangement pattern and the mask pattern and to securely execute the control of the ink application order in the unit pixel and the like.

Figure 10A:
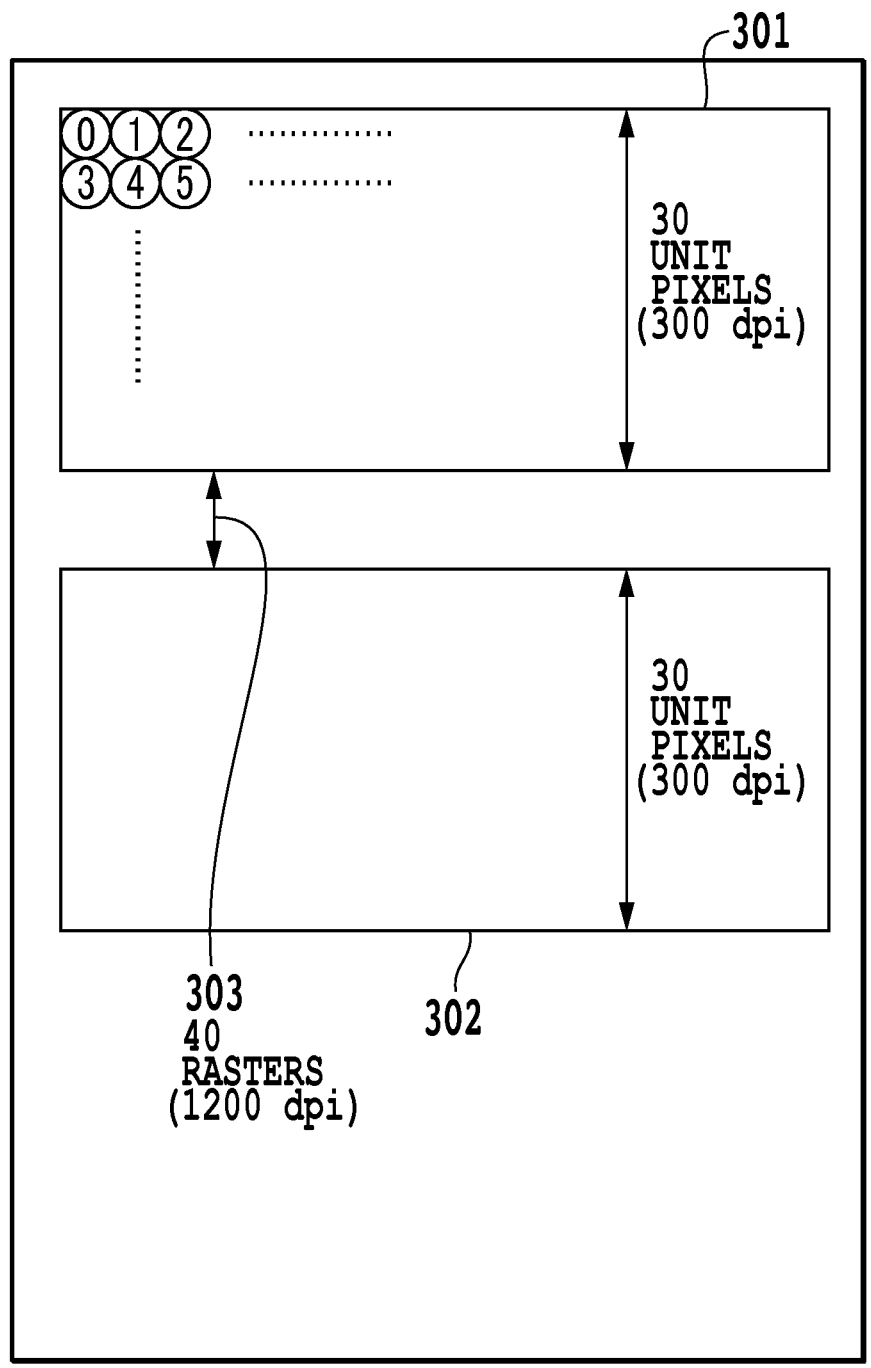
FIGS. 10A to 10D are diagrams for explaining processing for an image example generated by an application.
Figure 10B:
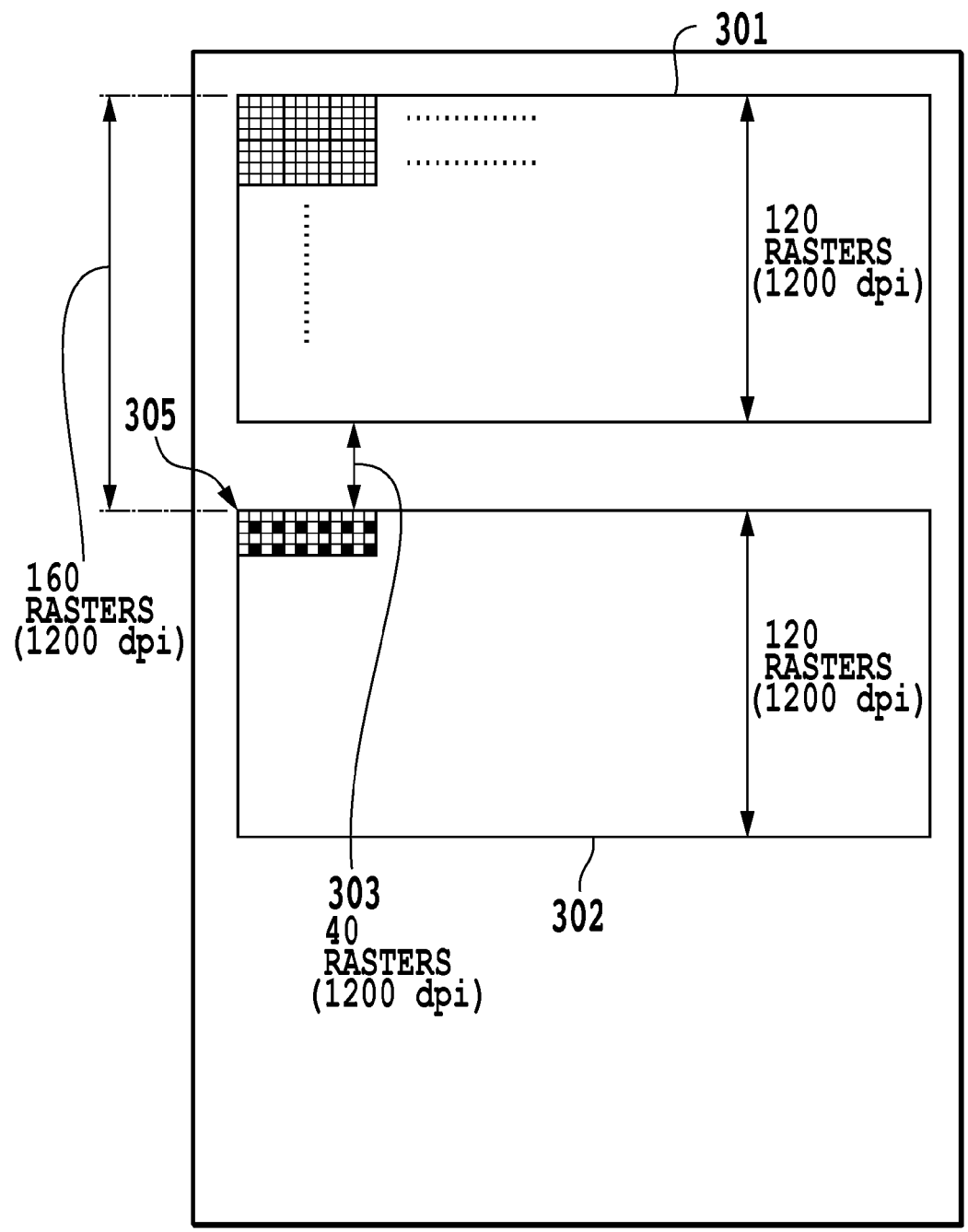
Figure 10C:
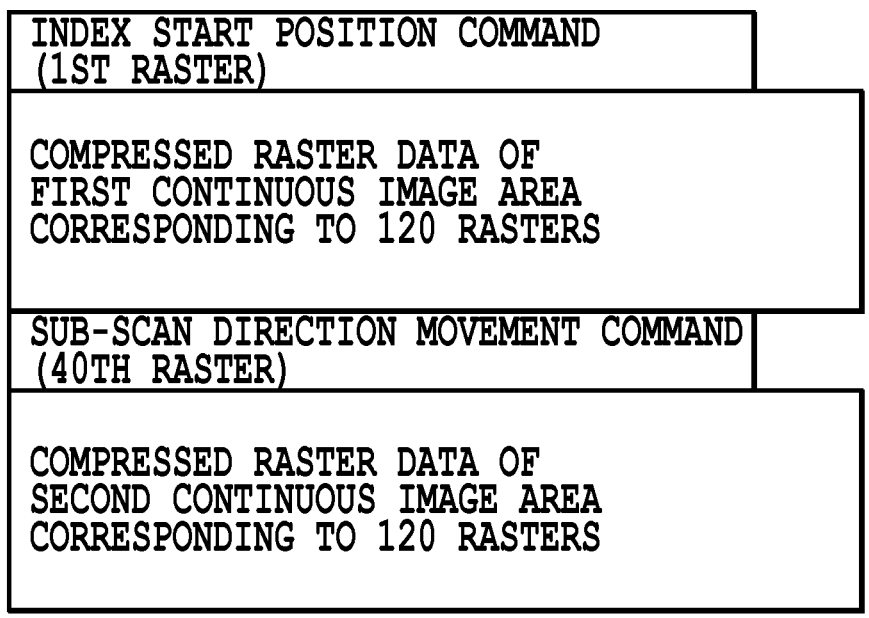
Figure 10D:
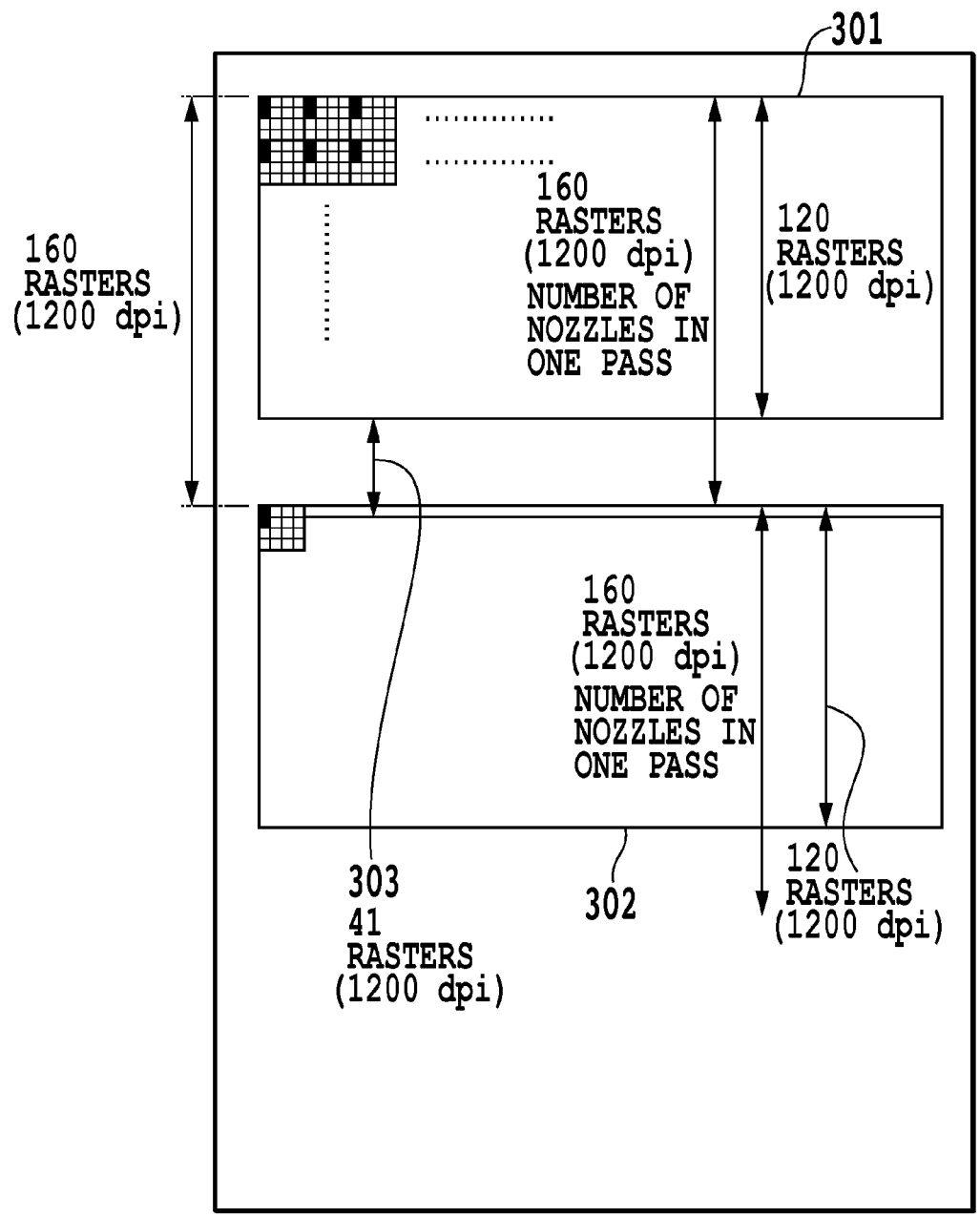

Note that, depending on the dot arrangement pattern to be used, there can be a situation in which rasters 305 having only continued non-printing pixels exist as in FIG. 10B, for example. In such a case, some raster image processing program is considered to cause a situation in which the rasters 305 having only the continuous non-printing pixels is determined to be included also in a blank space portion and added to a movement amount 304 of the sub-scan direction movement command although the actual blank space portion 303 corresponds to 40 rasters. However, by a configuration to transmit the information of the index start position to the printing apparatus accurately as in the present embodiment, it is possible to avoid the loss of the positional relationship between the dot arrangement pattern and the mask pattern.

(Embodiment 2)

Embodiment 1 has been explained for an example of the printing apparatus which uses the mask pattern having a configuration fixed for the respective printing elements of the printing head as shown in FIG. 5. Accordingly, when the distance between the two image area does not correspond to an integer multiple of the dot arrangement pattern (multiple of 4) even if the distance is short, as shown in FIG. 9A, the two image areas are printed by the different main scans having the back feed in between.

On the other hand, the present embodiment uses a printing apparatus in which the mask pattern can be set for the respective printing elements in each printing scan.

Figure 11:
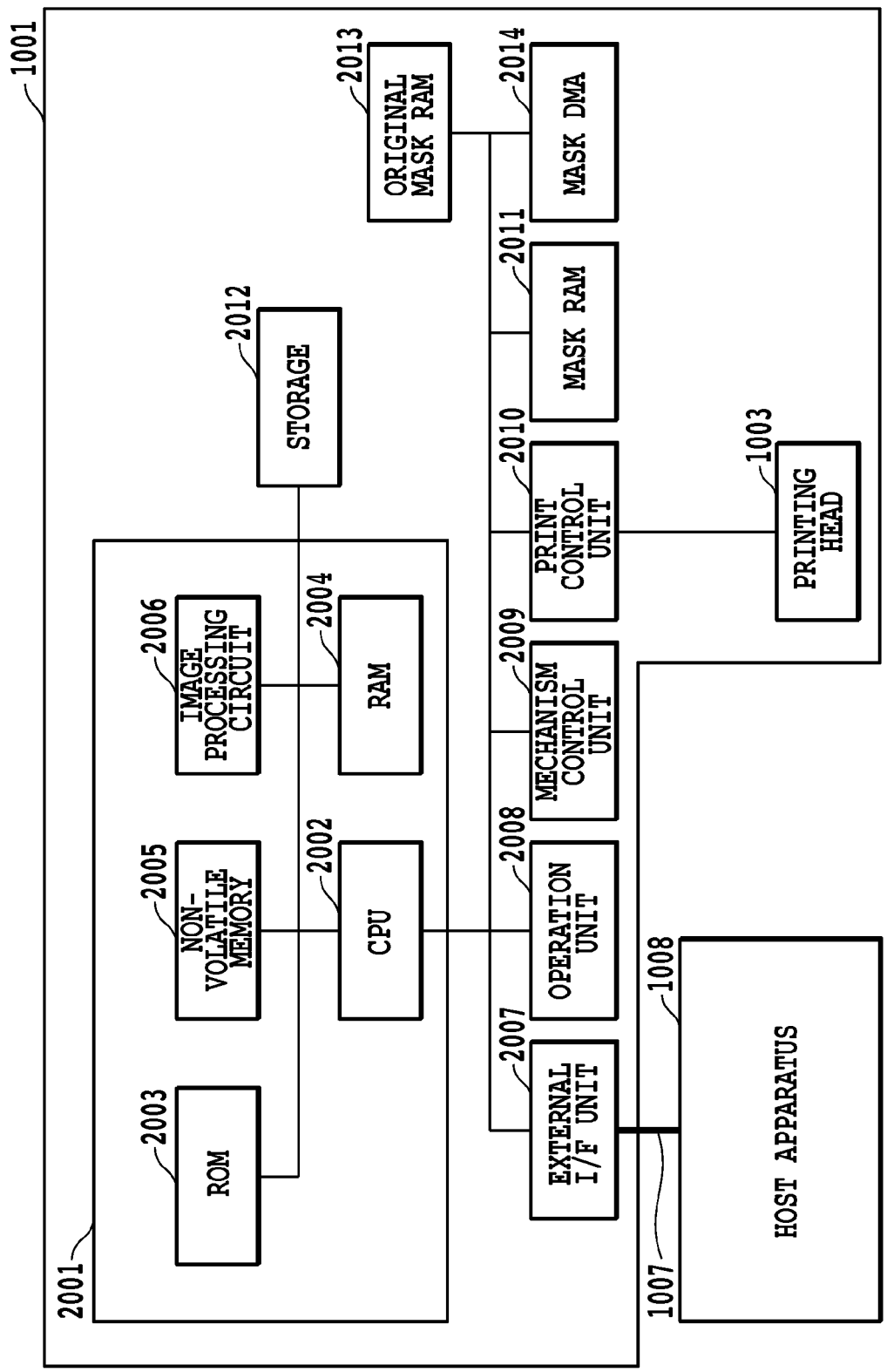
FIG. 11 is a block diagram explaining an image printing system configuration in an embodiment.

FIG. 11 is a block diagram for explaining a control configuration of an image printing system in the present embodiment. The configuration except an original mask RAM 2013 and a mask DMA 2014 is the same as that in Embodiment 1 and thus explanation will be omitted. The original mask RAM 2013 is a memory temporarily storing a mask pattern to be used for a current job in the same formation as that of FIG. 5. Further, the mask DMA 2014 has a function of generating a mask pattern in the mask RAM 2011 using the mask pattern stored in the original mask RAM 2013 while performing direct memory access. More specifically, the mask DMA 2019, according to an instruction from the control unit 2001, performs a job of extracting a mask pattern for each of the printing elements from the mask patterns stored in the original mask RAM 2013 to rewrite the mask RAM in each printing scans.

Figure 12:
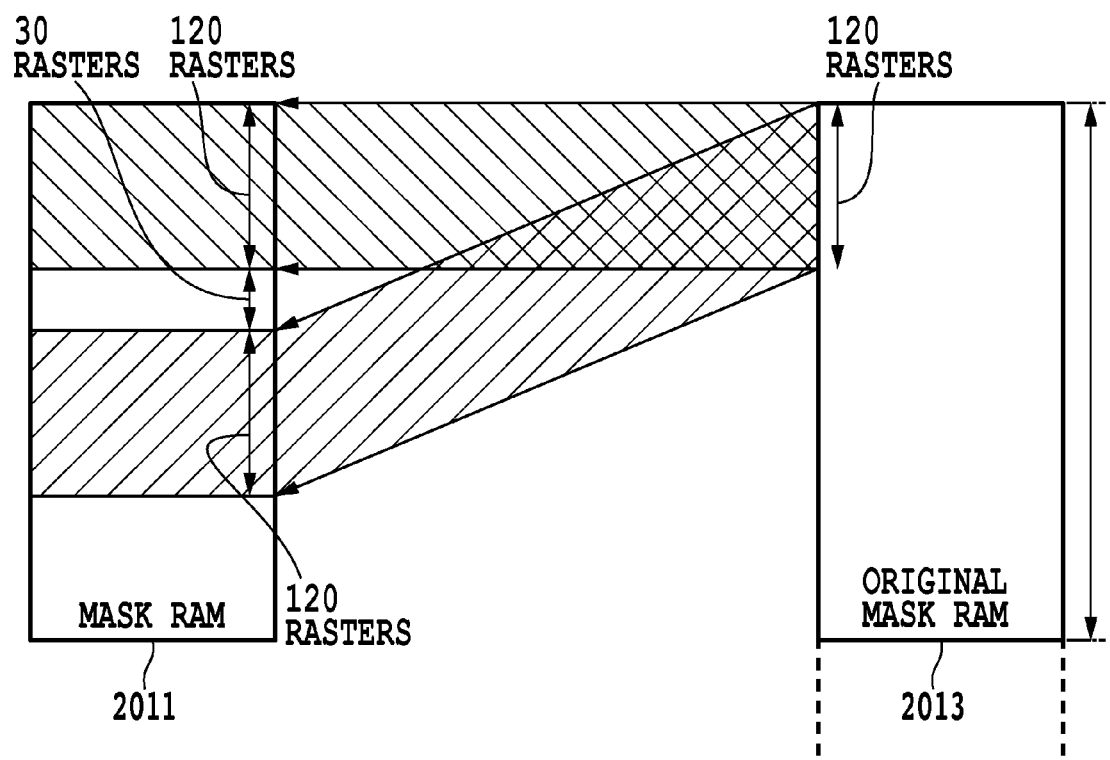
FIG. 12 is a schematic diagram explaining the operation of a mask DMA in an embodiment.

FIG. 12 is a schematic diagram explaining the operation of the mask DMA 2014 in extracting a mask pattern from the original mask RAM 2013 and preserving the mask data in the mask RAM 2011. The mask DMA can transfer the mask data from the original mask RAM 2013 to the mask RAM 2011 for each raster. An example in FIG. 12 shows a state in which the mask data corresponding to 120 leading rasters stored in the original mask RAM 2013 is copied to the first raster to the 120th raster, and the 151st raster to the 270th raster in the mask RAM 2011. A gap corresponding to 30 rasters is generated between the two mask data each of which is set to have 120 rasters, and this whole area is set to be an area (0) not allowing the printing. By using a mask pattern generated in this manner, it becomes possible to print two image areas in the same main scan even when the distance of the two image areas (30 rasters) does not correspond to an integer multiple of the dot arrangement pattern (multiple of 4) as in FIG. 9A.

Figure 13:
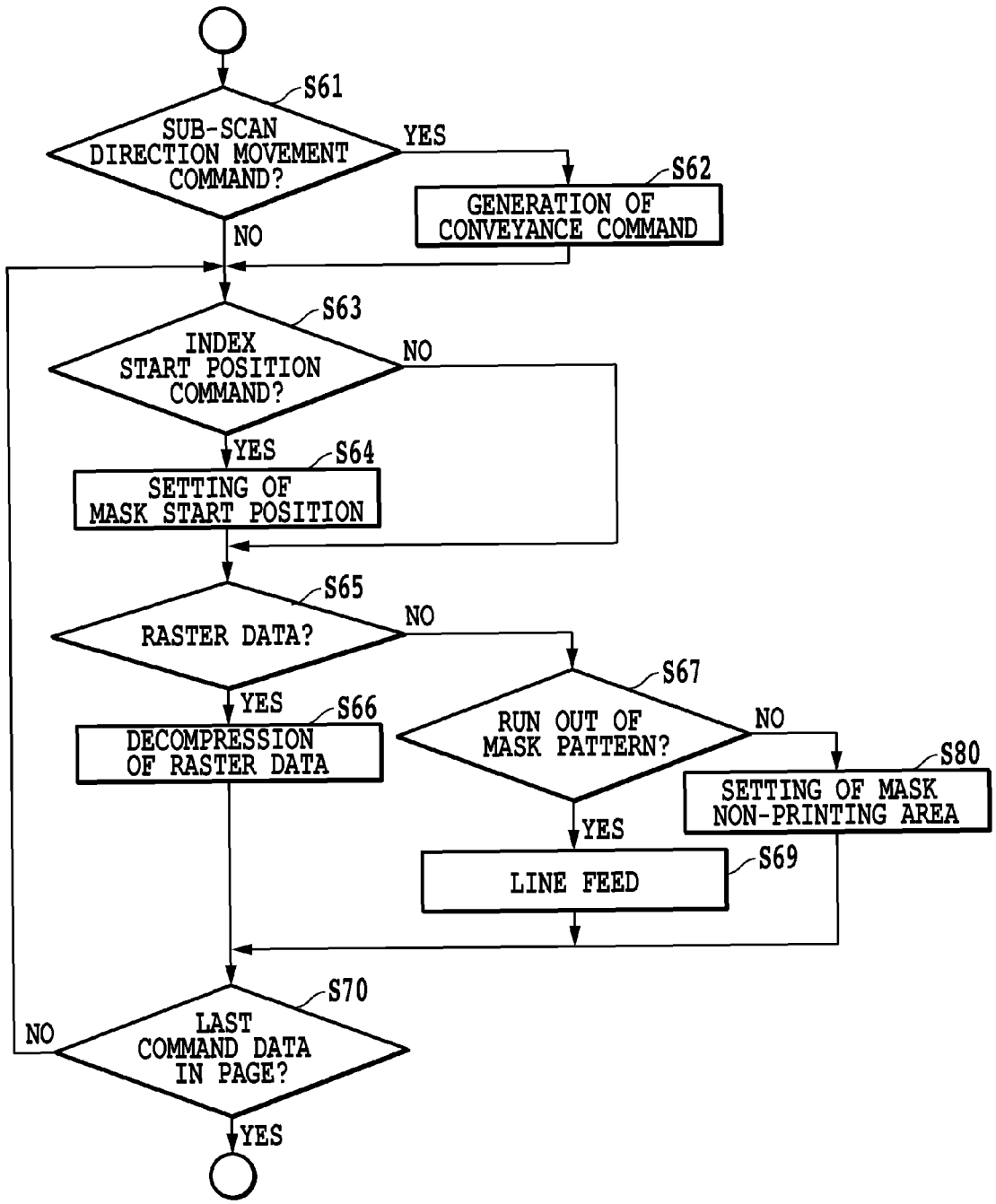
FIG. 13 is a flowchart explaining a command generation process of a printing operation in an embodiment.

FIG. 13 is a flowchart for explaining a process in which the control unit 2001 of the present embodiment generates a command for the printing operation according to the print job data for one page. A different point of this drawing from the flowchart of the Embodiment 1 shown in FIG. 7 is Step S80. In the present embodiment, the control unit 2001 determines whether or not the raster position of a movement destination runs off the edge of a divided region of the mask pattern set in Step S64. If the raster of the movement destination is determined not to run off the edge of the divided region of the current mask pattern, the control unit 2001 sets a non-printing allowance area in an area within the mask RAM 2011 corresponding to rasters up to the movement destination (Step S80). Then, the control unit 2001 causes the mask DMA to set the mask pattern in the mask RAM so as to locate the top of the mask pattern stored in the original mask RAM to the raster of the movement destination (Step S64). By such a configuration of the present embodiment, it is not necessary to print the two image areas in different main scans as in Embodiment 1 but it becomes possible to print the two image areas in the same main scan.

Figure 14:
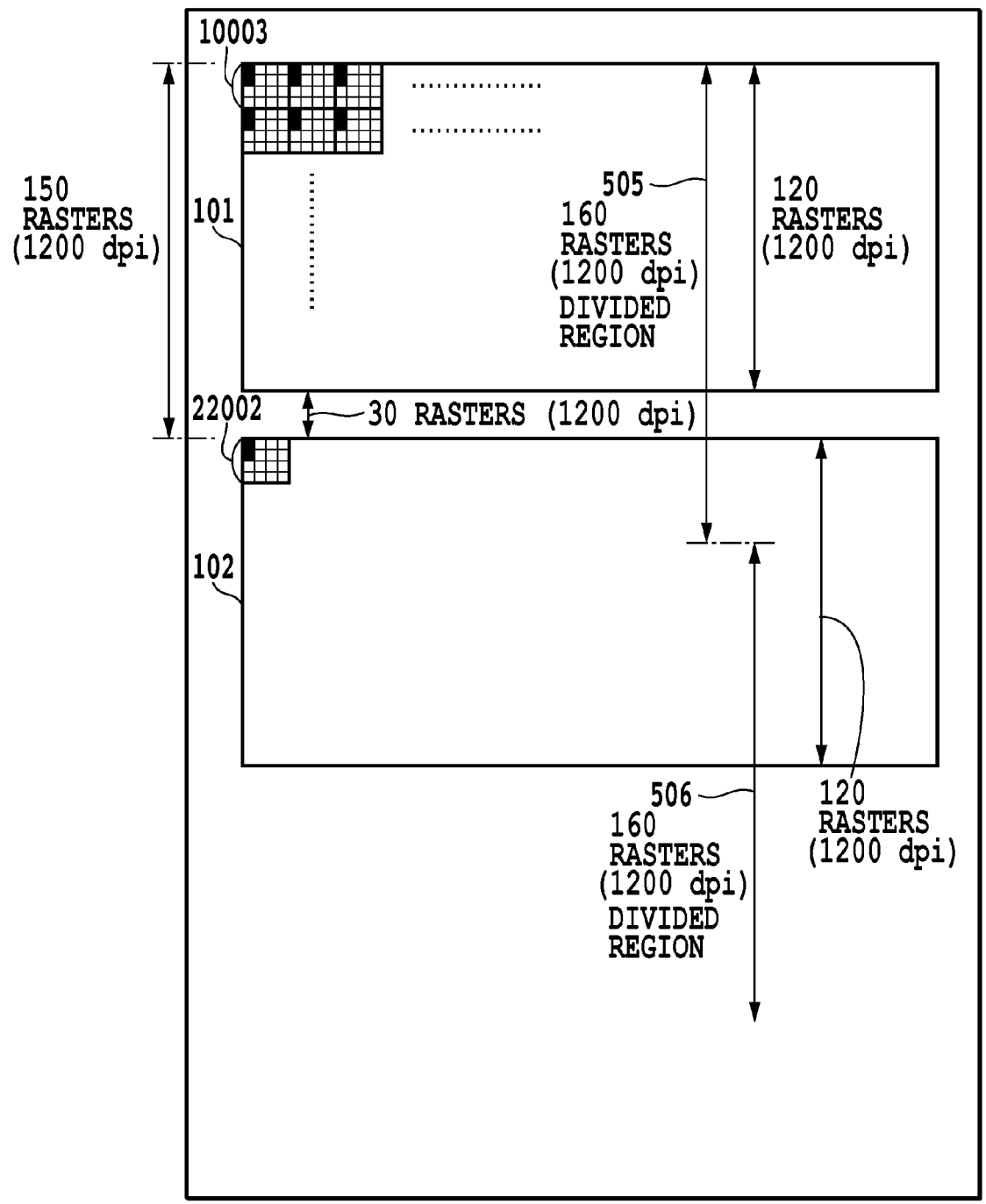
FIG. 14 is a diagram explaining an arrangement state of a mask pattern in an embodiment.

FIG. 14 is a diagram for explaining an arrangement state of the mask pattern to be generated by the control unit 2001 of the present embodiment, when the control unit 2001 has received the print job data shown in FIG. 9C. In the present embodiment, the printing of the image area 102 can be performed by the main scan when the divided region of the printing head is located at a position indicated by the arrow 505. That is, the back feed is not necessary between the image area 101 and the image area 102 and both of the areas can be printed continuously by the same main scan. Further, for the next main scan, it is possible to continue the main scan at a printing head position shown by the arrow 506 by setting the mask pattern in the mask RAM so as to cause the mask pattern set in Step S64 to be continued. As a result, it becomes possible to complete the printing within the page in a shorter time than in Embodiment 1.

(Other embodiments)

The above embodiments have been explained for the example of using the dot arrangement pattern according to Japanese Patent Laid-Open No. 2008-173969, the dot arrangement pattern having a biased arrangement of the printing pixels indicating printing (1) as shown in FIG. 4. Japanese Patent Laid-Open No. 2008-173969 uses different kinds of dot arrangement patterns for different kinds of inks respectively, one of dot arrangement patterns has a biased arrangement and the other of that does not have a biased arrangement, and further associates the dot arrangement pattern and the mask pattern with each other to control the order of applying the two kinds of ink onto the printing medium. However, the present invention is not limited to the dot arrangement pattern having a unit of 4×9 printing pixels as shown in FIG. 4. For example, when the unit pixel is formed by another size such as corresponding to 3×3 printing pixels and 5×5 printing pixels, the mask pattern may be formed by a unit of this size. Further, the item which can be controlled by the association between the dot arrangement pattern and the mask pattern is not also limited to the ink application order. For controlling whatever item, when the dot arrangement pattern and the mask pattern is configured in association with each other on the basis of the unit pixel, it is necessary to avoid the occurrence of the shift between these patterns, and the present invention capable of realizing this requirement functions effectively.

Further, while the above embodiments have been explained for the example of the ink jet printing apparatus 1001 which can perform printing even on a large size printing medium as shown in FIG. 1, the present invention is not limited to this example. The printing method may include a electrophotographic method, a thermal head method and a sublimation type, and the type of the apparatus may include a desk-top type printing apparatus having a cassette feeder, a manual feeder, and further plural feed stages. Further, the printing system may be a multi-functional type composite machine not only having a function of the printing apparatus but also combining a scanner and a FAX. Further, while the host apparatus 1008 and the printing apparatus 1001 are configured to be connected via the LAN cable 1007 in FIG. 1, the present invention is effective even when the apparatuses are connected by another method such as USB, IEEE1394, and es-ATA.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-298152, filed Dec. 28, 2009, which is hereby incorporated by reference herein in its entirety.

What is claimed is:

1. An image printing system configured with a host apparatus generating print job data according to image data of an original image and a printing apparatus printing an image on a printing medium by repeating a main scan of a printing head and a conveyance operation to convey the printing medium in a direction intersecting the main scan according to the print job data, the host apparatus comprising:
a unit configured to execute index processing which converts a unit pixel having multi-value density data obtained from the image data into a plurality of printing pixels having binary data that defines printing/non-printing of a dot;
a unit configured to generate an index start position command notifying the position of a raster for which the index processing has been started;
a unit configured to compress the binary data for each raster and generate compressed data;
a unit configured to generate a sub-scan direction movement command according to a blank space portion in the image data of the original image in the sub-scan direction; and
a unit configured to generate the print job data using the index start position command, the compressed data, and the sub-scan direction movement command,
and the printing apparatus comprising:
a unit configured to receive the print job data and to arrange a mask pattern which defines allowance or non-allowance of dot printing for each of the printing pixels, according to the index start position command;
a unit configured to decompress the compressed data; and
a conveyance command generation unit configured to generate a conveyance command for conveying the printing medium in the sub-scan direction according to the sub-scan direction movement command.

2. The image printing system according to claim 1, wherein the conveyance command generation unit generates the conveyance command for performing back feed or line feed of the printing medium according to a movement amount instructed by the sub-scan direction movement command.

3. The image printing system according to claim 1, wherein the printing apparatus carries out the main scan by arranging the printing head according the raster position instructed by the index start position command.

4. The image printing system according to claim 1, wherein the printing apparatus arranges the mask pattern corresponding to each of a plurality of printing elements arranged on the printing head, according to the raster position instructed by the index start position command.

5. The image printing system according to claim 1, wherein the printing head prints an area of the printing medium which can be printed by one main scan, by a plurality of main scans according to the mask pattern.

6. An image processing method for printing an image on a printing medium, in which a host apparatus generates print job data according to image data of an original image, and a printing apparatus which has received the print job data repeats a main scan of a printing head and a conveyance operation conveying the printing medium in a sub-scan direction intersecting the main scan according to the print job data, the method comprising causing the host apparatus to execute:
a step for executing index processing which converts a unit pixel having multi-value density data obtained from the image data into a plurality of printing pixels having binary data that defines printing/non-printing of a dot;
a step for generating an index start position command notifying the position of a raster for which the index processing has been started;
a step for compressing the binary data for each raster and generate compressed data;
a step for generating a sub-scan direction movement command according a blank space portion in the image data of the original image in a sub-scan direction; and
a step for generating the print job data using the index start position command, the compressed data, and the sub-scan direction movement command,
and the method also comprising causing the printing apparatus to execute:
a step for receiving the print job data;
a step for arranging a mask pattern which defines allowance or non-allowance of dot printing for each of the printing pixels, according to the index start position command;
a step for decompressing the compressed data; and
a step for generating a conveyance command for conveying the printing medium in the sub-scan direction according to the sub-scan direction movement command.

* * * * *